US008542687B2

(12) United States Patent
Harada

(10) Patent No.: US 8,542,687 B2
(45) Date of Patent: Sep. 24, 2013

(54) NODE APPARATUS AND ROUTE CALCULATION METHOD

(75) Inventor: Tomoyuki Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 301 days.

(21) Appl. No.: 12/862,157

(22) Filed: Aug. 24, 2010

(65) Prior Publication Data
US 2011/0058501 A1 Mar. 10, 2011

(30) Foreign Application Priority Data

Sep. 7, 2009 (JP) ................................. 2009-206219

(51) Int. Cl.
 *H04L 12/28* (2006.01)
(52) U.S. Cl.
 USPC ..................................... 370/395.31; 370/401
(58) Field of Classification Search
 USPC ................. 370/229–235, 252, 254, 255, 351, 370/389, 392, 395.31, 401
 See application file for complete search history.

(56) References Cited

U.S. PATENT DOCUMENTS

| 6,647,010 | B1 * | 11/2003 | Ford et al. ..................... 370/391 |
| 7,532,634 | B2 | 5/2009 | Higashitaniguchi et al. |
| 7,808,931 | B2 * | 10/2010 | Zelig et al. ..................... 370/258 |
| 8,094,575 | B1 * | 1/2012 | Vadlakonda et al. ......... 370/252 |
| 2002/0089969 | A1 * | 7/2002 | Kano et al. ..................... 370/351 |
| 2006/0221814 | A1 | 10/2006 | Bamba |
| 2008/0151783 | A1 * | 6/2008 | Bamba .......................... 370/254 |
| 2008/0198751 | A1 * | 8/2008 | Li ................................. 370/238 |
| 2008/0291924 | A1 * | 11/2008 | Ishii .............................. 370/400 |
| 2009/0180489 | A1 * | 7/2009 | Fujita et al. ................... 370/409 |
| 2010/0138539 | A1 * | 6/2010 | Neville et al. ................. 709/226 |

FOREIGN PATENT DOCUMENTS

| JP | 2006-279891 | 10/2006 |
| JP | 2008-67054 | 3/2008 |
| JP | 2008-160721 | 7/2008 |
| WO | 2004/073262 A1 | 8/2004 |

OTHER PUBLICATIONS

Japanese Office Action mailed Apr. 9, 2013 for corresponding Japanese Application No. 2009-206219.

* cited by examiner

*Primary Examiner* — Hong Cho
(74) *Attorney, Agent, or Firm* — Staas & Halsey LLP

(57) ABSTRACT

A node apparatus in a communication network, includes: a processing unit which, in the node apparatus, performs adding and dropping of a frame signal onto the communication network; and a storage unit which stores topology information having link information that specifies each link existing in the communication network, wherein information that specifies the processing unit provided in the node apparatus is included in the topology information as the link information concerning a link connected to the node apparatus.

2 Claims, 29 Drawing Sheets

FIG.7

| NODE APPARATUS | NODE ID | NODE IP |
|---|---|---|
| NODE 203A | 1.1.1.1 | 10.5.20.11 |
| NODE 203B | 2.2.2.2 | 10.5.20.12 |
| NODE 203C | 3.3.3.3 | 10.5.20.13 |
| NODE 203D | 4.4.4.4 | 10.5.20.14 |
| NODE 203E | 5.5.5.5 | 10.5.20.15 |
| NODE 203F | 6.6.6.6 | 10.5.20.16 |

FIG.8

| RPR STATION | RING ID |
|---|---|
| RPR STATION 230A | 900 |
| RPR STATION 230B | 900 |
| RPR STATION 230C | 900 |

FIG.9

| LINK | LINK ID |
|---|---|
| LINK 220A1 | 1 |
| LINK 220A2 | 5 |
| FosPort(East) of RPR STATION 230A | 3 |
| FosPort(West) of RPR STATION 230A | 4 |
| LINK 220B1 | 2 |
| LINK 220B2 | 5 |
| LINK 220B3 | 11 |
| LINK 220B4 | 12 |
| FosPort(East) of RPR STATION 230B | 7 |
| FosPort(West) of RPR STATION 230B | 8 |
| LINK 220C1 | 2 |
| LINK 220C2 | 5 |
| LINK 220C3 | 20 |
| LINK 220D1 | 1 |
| LINK 220D2 | 3 |
| LINK 220D3 | 7 |
| LINK 220D4 | 8 |
| LINK 220E1 | 2 |
| LINK 220E2 | 10 |
| LINK 220E3 | 100 |
| LINK 220F1 | 5 |
| LINK 220F2 | 6 |
| FosPort(East) of RPR STATION 230F | 3 |
| FosPort(West) of RPR STATION 230F | 4 |

FIG.13

| FIRST SLOT | FIRST PORT | FIRST CHANNEL | SECOND SLOT | SECOND PORT | SECOND CHANNEL | BANDWIDTH |
|---|---|---|---|---|---|---|
| 1 | 1 | 2 | 2 | 3 | 7 | STS3C |
| 1 | 1 | 6 | 2 | 3 | 13 | STS1 |
| ⋮ | ⋮ | ⋮ | ⋮ | ⋮ | ⋮ | ⋮ |
| 3 | 1 | 10 | 1 | 1 | 20 | STS48C |
| 1 | 1 | 25 | 3 | 1 | 11 | STS48C |
| ⋮ | ⋮ | ⋮ | ⋮ | ⋮ | ⋮ | ⋮ |
| 3 | 2 | 10 | 2 | 3 | 20 | STS48C |
| 2 | 3 | 25 | 3 | 2 | 11 | STS48C |
| ⋮ | ⋮ | ⋮ | ⋮ | ⋮ | ⋮ | ⋮ |

FIG.14

| NODE ID | NODE IP |
|---|---|
| 1.1.1.1 | 10.5.20.11 |

FIG.15

| LINK ID | LINK TYPE | RING ID | REMOTE NODE ID | REMOTE NODE IP | REMOTE NODE LINK ID |
|---|---|---|---|---|---|
| 1 | Normal | | 2.2.2.2 | 10.5.20.12 | 2 |
| ⋮ | ⋮ | ⋮ | ⋮ | ⋮ | ⋮ |
| 3 | FosPort(East) | 900 | | | |
| 4 | FosPort(West) | 900 | | | |
| ⋮ | ⋮ | ⋮ | ⋮ | ⋮ | ⋮ |
| 5 | Normal | | 3.3.3.3 | 10.5.20.13 | 2 |

FIG.16

| LINK ID | SLOT | PORT |
|---|---|---|
| 1 | 1 | 1 |
| 5 | 2 | 3 |
| 3 | 3 | 1 |
| 4 | 3 | 2 |

F I G. 17

| NODE ID | LINK ID | LINK TYPE | RING ID | REMOTE NODE ID | REMOTE NODE LINK ID |
|---|---|---|---|---|---|
| 1.1.1.1 | 1 | Normal | | 2.2.2.2 | 2 |
| 1.1.1.1 | 3 | FosPort(East) | 900 | | |
| 1.1.1.1 | 4 | FosPort(West) | 900 | | |
| 1.1.1.1 | 5 | Normal | | 2.2.2.2 | 2 |
| 2.2.2.2 | 2 | Normal | | 1.1.1.1 | 1 |
| 2.2.2.2 | 5 | Normal | | 3.3.3.3 | 5 |
| 2.2.2.2 | 7 | FosPort(East) | 900 | | |
| 2.2.2.2 | 8 | FosPort(West) | 900 | | |
| 2.2.2.2 | 11 | Normal | | 4.4.4.4 | 7 |
| 2.2.2.2 | 12 | Normal | | 4.4.4.4 | 8 |
| ⋮ | ⋮ | ⋮ | ⋮ | ⋮ | ⋮ |

FIG.30

| RPR STATION | RING ID |
|---|---|
| RPR STATION 230A | 900 |
| RPR STATION 230B1 | 900 |
| RPR STATION 230F | 900 |
| RPR STATION 230B2 | 901 |
| RPR STATION 230C | 901 |
| RPR STATION 230E | 901 |

FIG.31

| LINK | LINK ID |
|---|---|
| LINK 220A1 | 1 |
| LINK 220A2 | 5 |
| FosPort(East) of RPR STATION 230A | 3 |
| FosPort(West) of RPR STATION 230A | 4 |
| LINK 220B1 | 2 |
| LINK 220B2 | 5 |
| LINK 220B3 | 11 |
| LINK 220B4 | 12 |
| FosPort(East) of RPR STATION 230B1 | 7 |
| FosPort(West) of RPR STATION 230B1 | 8 |
| FosPort(East) of RPR STATION 230B2 | 9 |
| FosPort(West) of RPR STATION 230B2 | 10 |
| LINK 220C1 | 2 |
| LINK 220C2 | 5 |
| LINK 220C3 | 20 |
| FosPort(East) of RPR STATION 230C | 7 |
| FosPort(West) of RPR STATION 230C | 8 |
| LINK 220D1 | 1 |
| LINK 220D2 | 3 |
| LINK 220D3 | 7 |
| LINK 220D4 | 8 |
| LINK 220E1 | 2 |
| LINK 220E2 | 10 |
| LINK 220E3 | 100 |
| FosPort(East) of RPR STATION 230E | 1 |
| FosPort(West) of RPR STATION 230E | 2 |
| LINK 220F1 | 5 |
| LINK 220F2 | 6 |
| FosPort(East) of RPR STATION 230F | 3 |
| FosPort(West) of RPR STATION 230F | 4 |

FIG.32

| LINK ID | LINK TYPE | RING ID | REMOTE NODE ID | REMOTE NODE IP | REMOTE NODE LINK ID |
|---------|-----------|---------|----------------|----------------|---------------------|
| ⋮ | ⋮ | ⋮ | ⋮ | ⋮ | ⋮ |
| 2 | Normal | | 1.1.1.1 | 10.5.20.11 | 1 |
| ⋮ | ⋮ | ⋮ | ⋮ | ⋮ | ⋮ |
| 5 | Normal | | 3.3.3.3 | 10.5.20.13 | 5 |
| ⋮ | ⋮ | ⋮ | ⋮ | ⋮ | ⋮ |
| 7 | FosPort(East) | 900 | | | |
| 8 | FosPort(West) | 900 | | | |
| 9 | FosPort(East) | 901 | | | |
| 10 | FosPort(West) | 901 | | | |
| ⋮ | ⋮ | ⋮ | ⋮ | ⋮ | ⋮ |
| 11 | Normal | | 4.4.4.4 | 10.5.20.14 | 7 |
| 12 | Normal | | 4.4.4.4 | 10.5.20.14 | 8 |

FIG.33

| NODE ID | LINK ID | LINK TYPE | RING ID | REMOTE NODE ID | REMOTE NODE LINK ID |
|---------|---------|-----------|---------|----------------|---------------------|
| 1.1.1.1 | 1 | Normal | | 2.2.2.2 | 2 |
| 1.1.1.1 | 3 | FosPort(East) | 900 | | |
| 1.1.1.1 | 4 | FosPort(West) | 900 | | |
| 1.1.1.1 | 5 | Normal | | 2.2.2.2 | 2 |
| 2.2.2.2 | 2 | Normal | | 1.1.1.1 | 1 |
| 2.2.2.2 | 5 | Normal | | 3.3.3.3 | 5 |
| 2.2.2.2 | 7 | FosPort(East) | 900 | | |
| 2.2.2.2 | 8 | FosPort(West) | 900 | | |
| 2.2.2.2 | 9 | FosPort(East) | 901 | | |
| 2.2.2.2 | 10 | FosPort(West) | 901 | | |
| 2.2.2.2 | 11 | Normal | | 4.4.4.4 | 7 |
| 2.2.2.2 | 12 | Normal | | 4.4.4.4 | 8 |
| ⋮ | ⋮ | ⋮ | ⋮ | ⋮ | ⋮ |

NODE APPARATUS AND ROUTE CALCULATION METHOD

CROSS-REFERENCE TO RELATED APPLICATIONS

This application is based upon and claims the benefit of priority of the prior Japanese Patent Application No. 2009-206219, filed on Sep. 7, 2009, the entire contents of which are incorporated herein by reference.

FIELD

This application is concerned with a node apparatus that transmits data over a communication network and a method for setting up a path passing through such node apparatus.

BACKGROUND

In recent years, MPLS (Multi-Protocol Label Switching) that manages network paths by applying the label switching to IP (Internet Protocol) networks has come into wide use. Further, GMPLS (Generalized Multi-Protocol Label Switching) which can be applied not only to IP networks, but also to time division multiplexing networks, such as SDH (Synchronous Digital Hierarchy)/SONET (Synchronous Optical NETwork) and other networks, such as wavelength division multiplexing networks, has been commercially implemented. The description given herein deals with, as an example, a communication network in which paths are set up by using GMPLS.

FIG. 1 is a diagram illustrating an example of a path generation sequence in GMPLS. In the example of FIG. 1, path generation (signaling) is performed to set up a path from a start point node N1 to an endpoint node N4. In this patent specification, the start point node N1 which provides an entrance to a communication network for the path to be set up may be referred to as the ingress node. Similarly, the endpoint node N4 which provides an exit from the communication network for the path to be set up may be referred to as the egress node.

First, the start point node N1 transmits a path message "PathMsg", a request message for requesting the reservation of a path setup, to its adjacent node N2. In the PathMsg, the start point node N1 specifies ERO (Explicit_Route Object), i.e., routing information for the path to be set up from the start point node N1 to the endpoint node N4, and a label that the node N1 intends to use between it and the node N2.

At the node N2, if the label specified in the received PathMsg is not in use, the label is set to a reserved state. The node N2 then transmits a similar PathMsg to the next intermediate node N3. The node N3 performs the same processing as the node N2, and transmits the PathMsg to the endpoint node N4.

Then, at the node N4, if the path requested by the received PathMsg can be set up, the node N4 returns a reserve message "ResvMsg". The reserve message corresponds to a response message delivered to notify that the reservation of the path requested by the PathMsg is completed. After transmitting the ResvMsg, the node N4 sets up a cross connect in the endpoint node N4 in order to generate the path requested by the PathMsg.

The node N3 that received the ResvMsg from the endpoint node N4 sets up a cross connect in the node N3 so that the requested path is generated, and forwards the ResvMsg to the node N2. The same processing is performed at the nodes N2 and N1, and the path setup between the node N1 and the node N4 is completed.

FIG. 2 is a diagram illustrating the data structure of the path message. In the figure, the fields (objects) which are not hatched are optional objects. This convention also applies to the data structures illustrated in FIGS. 3 and 22 hereinafter given. A brief description of the data carried in the PathMsg is given below.

SESSION, SENDER_TEMPLATE: Fields for storing connection identification information, the path being made uniquely identifiable by combining five kinds of information (ingress address, egress address, tunnel ID, LSP ID, and extended tunnel ID).

RSVP_HOP: Stores the local ID of the path message PathMsg transmitting node as identification information for the fiber used.

TIME_VALUES: A field for storing path refresh interval, i.e., refresh timer length.

EXPLICIT_ROUTE: A field for storing routing information specifying a route along which the path is to be routed.

LABEL_REQUEST: A field for storing the type of the requested label.

PROTECTION: A field for storing the kind, etc. of the protection that the path requests.

SESSION_ATTRIBUTE: A field for storing the name of the path, etc.

ADMIN_STATUS: A field for storing special information such as Admin_Down and Deletion.

SENDER_TSPEC: A field for storing rate information (2.5G, 10G, etc.) that the path requests.

UPSTREAM_LABEL: A field for storing the reserved label information (information for identifying wavelength).

ALARM_SPEC: A field for storing the kind and time of alarm generation.

NOTIFY_REQUEST: An object used to request the transmission of a NotifyMsg (to be described later) when a failure occurs on the requested path.

FIG. 3 is a diagram illustrating the data structure of the reserve message ResvMsg. A brief description of the data carried in the ResvMsg is given below.

RESV_CONFIRM: A field for storing information used when requesting the transmission of a ResvConfMsg.

FLOWSPEC: A field for storing the same connection identification information as that stored in the SENDER_TEMPLATE object carried in the PathMsg.

FILTERSPEC: A field for storing the requested rate information, as in the SENDER_TSPEC object carried in the PathMsg.

LABEL: A field for storing the label information, as in the UPSTREAM_LABEL object carried in the PathMsg.

ALARM_SPEC: A field for storing the type and time of alarm generation.

NOTIFY_REQUEST: An object used to request the transmission of the NotifyMsg (to be described later) when a failure occurs on the requested path.

On the other hand, in packet communications, RPR (Resilient Packet Ring) is defined in IEEE 802.17 as a ring network topology that provides enhanced fault tolerance while using SONET as a communication network. FIG. 4 is a diagram illustrating an example of an RPR network.

The RPR network 200 includes a dual-ring transmission line constructed from two transmission lines, a 0-numbered transmission line 201 (ringlet 0) and a 1-numbered transmission line 202 (ringlet 1), and node apparatuses 203A to 203D inserted in these transmission lines. The clockwise-rotating ringlet is called the ringlet 0, and the counterclockwise-rotating ringlet is called the ringlet 1.

The node apparatuses 203A to 203D connect the RPR network 200 to external networks 204A to 204D, respectively. The RPR network 200 relays the transmission/reception of frames among the external networks 204a to 204A. In the following description, the direction in which each node apparatus transmits data out onto the ringlet 0 may be referred to as the east, and the direction in which each node apparatus transmits data out onto the ringlet 1 may be referred to as the west.

FIG. 5 is a diagram illustrating a condition in which a cross connect that matches a path forming the RPR network is set within each node apparatus equipped with an RPR unit. Solid line 205 indicates a transmission line in the communication network, and semi-dashed line 206 indicates a ring-shaped network which forms the RPR network. The transmission line 205 includes, for example, an optical fiber for transmitting data in the clockwise direction in the figure and an optical fiber for transmitting data in the counterclockwise direction.

To form the ring-shaped network 206, a line interface unit (LIU) 101, to which a line connecting to a node adjacent in the east direction is connected, and a line interface unit 102, to which a line connecting to a node adjacent in the west direction is connected, are used in the node apparatus 203A. Likewise, a line interface unit 111, to which a line connecting to a node adjacent in the east direction is connected, and a line interface unit 112, to which a line connecting to a node adjacent in the west direction is connected, are used in the node apparatus 203B.

The node apparatus 203A includes an RPR unit 103. The RPR unit 103 encapsulates the frame received from the external network 204A and inserts (adds) the encapsulated RPR frame into the network 206. Further, the RPR unit 103 removes (drops) an RPR frame flowing in the network 206, decapsulates it, and transmits the decapsulated frame into the external network 204A. Similarly, the node apparatus 203B includes an RPR unit 113.

In the node apparatus 203A, a path is set between the line interface unit 101 and the RPR unit 103 by a cross connect set up by a switch 104. Likewise, a path is set between the line interface unit 102 and the RPR unit 103 by a cross connect set up by the switch 104.

In the node apparatus 203B also, a switch 114 is provided to set up a cross connect between the line interface unit 111 and the RPR unit 113 and a cross connect between the line interface unit 112 and the RPR unit 113. The cross connects set up by the switches 104 and 114 are indicated by dashed lines. By thus setting up the cross connects using the switches 104 and 114, a path connecting between the respective RPR units 103 and 113 is formed, forming the ring-shaped network 206.

An RPR apparatus that can construct an RPR network without incorporating the L3 function is disclosed. This RPR apparatus includes a storage unit which stores mapping between an RPR apparatus address indicating each RPR apparatus connected to a ring and a user device address indicating a user device accommodated in each RPR apparatus, and when the RPR apparatus receives from a user device accommodated therein data addressed to some other user device, if the RPR apparatus address of the RPR apparatus accommodating that other user device is stored in the storage unit, the RPR apparatus transmits the data onto the RPR network by appending to it an RPR header in which that RPR apparatus address is set as the destination RPR apparatus address.

There is also disclosed a line accommodating apparatus wherein a plurality of optical interfaces 40 connected to a first communication system such as SONET and a plurality of stations 30 connected to a second communication system such as an RPR network 70 that uses the SONET as a communication medium are mounted in a shelf 10, and wherein the stations 30 and the optical interfaces 40 are connected via a path control unit 50. The stations 30, the optical interfaces 40, and the path control unit 50 are collectively controlled by an intelligent card 20, and when adding or deleting any station 30, the intelligent card 20 switches the connection path in the path control unit 50.

Related art is disclosed in International Publication Pamphlet No. WO2004/073262 and Japanese Laid-open Patent Publication No. 2006-279891.

SUMMARY

According to one embodiment, a node apparatus is provided in a communication network including: a processing unit which, in the node apparatus, performs adding and dropping of a frame signal onto the communication network; and a storage unit which stores topology information having link information that specifies each link existing in the communication network. The topology information includes information that specifies the processing unit provided in the node apparatus as the link information concerning a link connected to the node apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWING(S)

FIG. 7 is a table illustrating the node ID and node IP assigned to each node apparatus;

FIG. 8 is a table illustrating a first example of the assignment of ring IDs to RPR stations;

FIG. 9 is a table illustrating a first example of the assignment of link IDs to links;

FIG. 13 is a diagram illustrating an example of the data structure of cross-connect information;

FIG. 14 is a diagram illustrating an example of the data structure of node information;

FIG. 15 is a diagram illustrating a first example of the data structure of connection link information;

FIG. 16 is a diagram illustrating an example of the data structure of link ID registration information;

FIG. 17 is a diagram illustrating a first example of the data structure of network topology information;

FIG. 30 is a table illustrating a second example of the assignment of ring IDs to RPR stations;

FIG. 31 is a table illustrating a second example of the assignment of link IDs to links;

FIG. 32 is a diagram illustrating a second example of the data structure of the connection link information;

FIG. 33 is a diagram illustrating a second example of the data structure of the network topology information;

DESCRIPTION OF EMBODIMENT(S)

Figure 6:
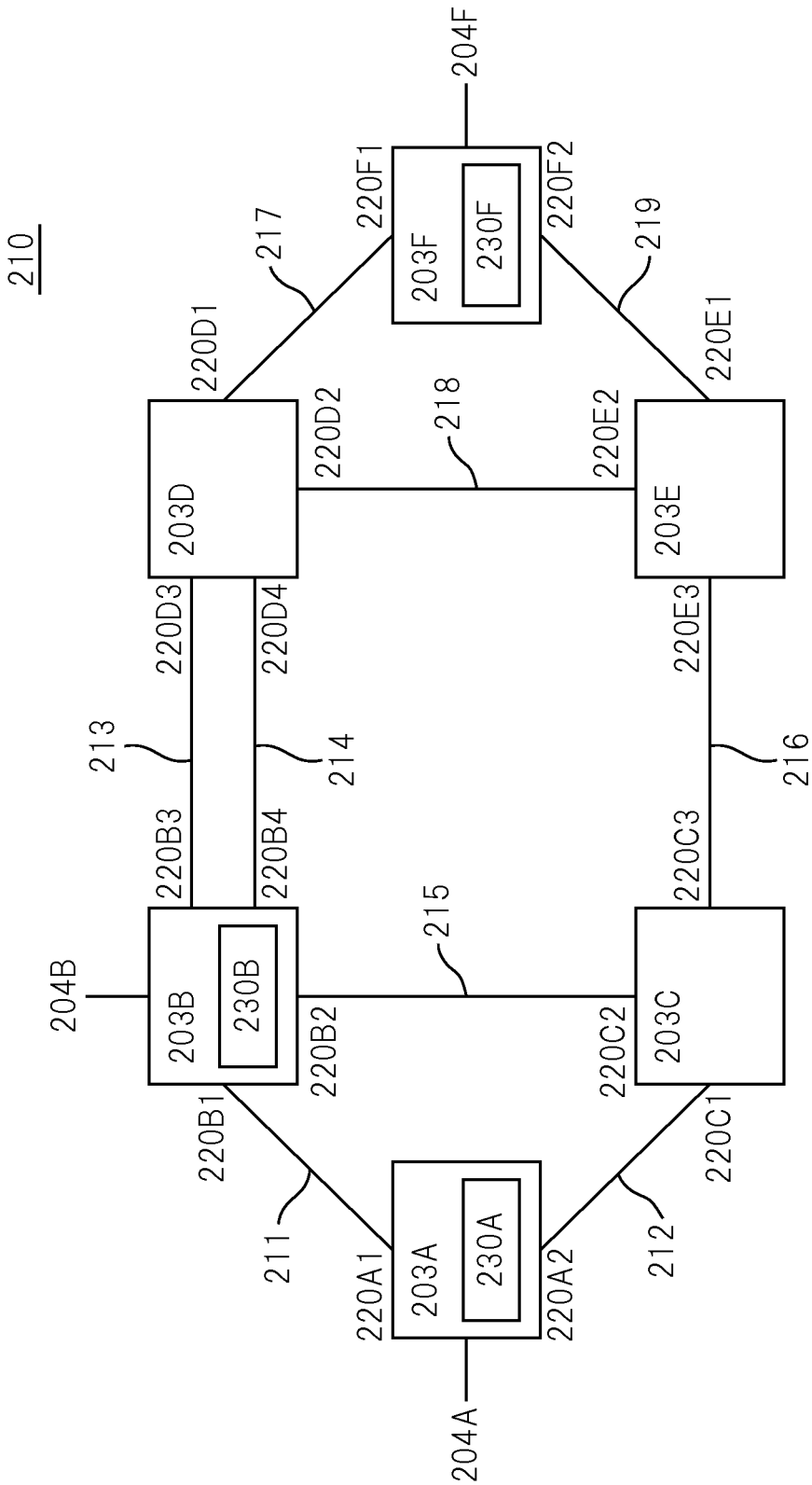
FIG. 6 is a diagram illustrating a first example of a communication network according to an embodiment.

An embodiment will be described with reference to the accompanying drawings. FIG. 6 is a diagram illustrating a first example of a communication network according to the embodiment. In FIG. 6, the communication network 210 includes a plurality of node apparatuses 203A to 203F and a plurality of links 211 to 219 interconnecting the node apparatuses.

The link 211 connects between the node apparatuses 203A and 203B, the link 212 connects between the node apparatuses 203A and 203C, the links 213 and 214 connect between the node apparatuses 203B and 203D, and the link 215 connects between the node apparatuses 203B and 203C. Further, the link 216 connects between the node apparatuses 203C and 203E, the link 217 connects between the node apparatuses 203D and 203F, the link 218 connects between the node apparatuses 203D and 203E, and the link 219 connects between the node apparatuses 203E and 203F.

In certain routing protocols, each link in topology information is identified for each of the node apparatuses connected by that link. Such protocols include, for example, OSPF-TE (Open Shortest Path First-Traffic Engineering), etc. For example, reference numerals 220A1 and 220B1 are used when referring to the same link 211 as the links connected to the node apparatuses 203A and 203B, respectively. Reference numerals 220A2 and 220C1 are used when referring to the same link 212 as the links connected to the node apparatuses 203A and 203C, respectively.

Reference numerals 220B3 and 220D3 are used when referring to the same link 213 as the links connected to the node apparatuses 203B and 203D, respectively. Reference numerals 220B4 and 220D4 are used when referring to the same link 214 as the links connected to the node apparatuses 203B and 203D, respectively.

Reference numerals 220B2 and 220C2 are used when referring to the same link 215 as the links connected to the node apparatuses 203B and 203C, respectively. Reference numerals 220C3 and 220E3 are used when referring to the same link 216 as the links connected to the node apparatuses 203C and 203E, respectively. Reference numerals 220D1 and 220F1 are used when referring to the same link 217 as the links connected to the node apparatuses 203D and 203F, respectively.

Reference numerals 220D2 and 220E2 are used when referring to the same link 218 as the links connected to the node apparatuses 203D and 203E, respectively. Reference numerals 220E1 and 220F1 are used when referring to the same link 219 as the links connected to the node apparatuses 203E and 203F, respectively.

The node apparatuses 203A, 203B, and 203F are each equipped with an RPR unit. The RPR unit provided in each of these node apparatuses encapsulates an Ethernet (registered trademark) frame received from an external network 204A, 204B, or 204F, and inserts (adds) the encapsulated RPR frame into an RPR network. Further, the RPR unit provided in each of these node apparatuses removes (drops) an RPR frame flowing in the RPR network. Then, the RPR unit decapsulates the RPR frame into an Ethernet (registered trademark) frame, and transfers the Ethernet (registered trademark) frame into the external network 204A, 204B, or 204F. Reference numerals 230A, 230B, and 230F designate RPR stations implemented by the RPR units provided in the respective node apparatuses 203A, 203B, and 203F.

For convenience of the following description, the node IDs and node IPs of the node apparatuses 203A, 203B, and 203F are defined as depicted in the table of FIG. 7. The node ID is an identifier assigned to each node apparatus, and the node IP is address information used when transmitting or receiving a path setup message such as the earlier described PathMsg or ResvMsg.

Further, the ring IDs of the RPR stations 230A, 230B, and 230F are defined as depicted in the table of FIG. 8. The ring ID is an identifier for identifying the RPR network to which the corresponding ring station belongs. The link IDs of the links 220A1, 220A2, 220B1 to 220B4, 220C1 to 220C3, 220D1 to 220D4, 220E1 to 220E3, 220F1, and 220F2 are defined as depicted in the table of FIG. 9. The link ID is an identifier for identifying each link and is defined independently for each of the node apparatuses 203A to 203F.

As will be described later, the RPR units implementing the respective RPR stations 230A, 230B, and 230F are each equipped with a port connected to a link extending in the east direction of the RPR network and a port connected to a link extending in the west direction of the RPR network. In the description given herein, the port connected to the link extending in the east direction of the RPR network may be designated as "FoSPort (East)." Likewise, the port connected to the link extending in the west direction of the RPR network may be designated as "FoSPort (West)." FoSPort (East) and FoSPort (West) may be collectively designated as the "RPR ports."

In the present embodiment, the link ID is also defined for each of the RPR ports of the RPR stations 230A, 230B, and 230F. In the example of FIG. 9, FoSPort (East) and FoSPort (West) of the RPR station 230A are assigned the link IDs 3 and 4, respectively. FoSPort (East) and FoSPort (West) of the RPR station 230B are assigned the link IDs 7 and 8, respectively. FoSPort (East) and FoSPort (West) of the RPR station 230F are assigned the link IDs 3 and 4, respectively.

Figure 10:
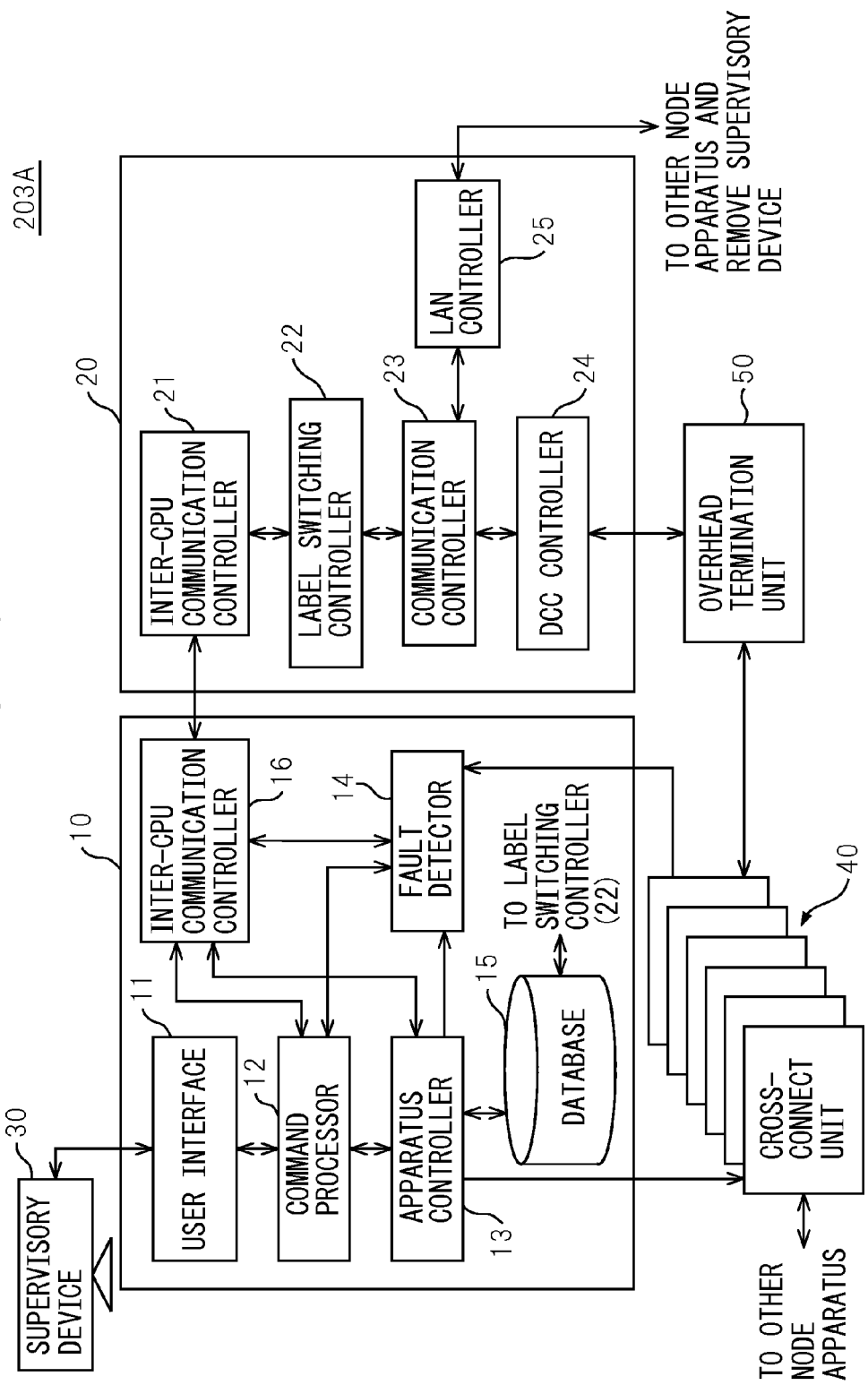
FIG. 10 is a diagram illustrating a configuration example of the node apparatus according to the embodiment.

FIG. 10 is a diagram illustrating a configuration example of the node apparatus 203A according to the embodiment. The other node apparatuses 203B to 203F may have the same configuration. The node apparatus 203A includes an apparatus control unit 10, a communication control unit 20, a supervisory device 30, a cross-connect unit 40, and an overhead termination unit 50. The supervisory device 30 is connected to the apparatus control unit 10. The cross-connect unit 40, which is also connected to the apparatus control unit 10, has a function to interface with other nodes and performs cross connect operations. The overhead termination unit 50 is connected to the communication control unit 20 and also to the cross-connect unit 40. The functions of the apparatus control unit 10 and communication control unit 20 hereinafter described may be implemented by executing a certain program on a computer having a memory and an instruction processing unit such as a CPU.

The apparatus control unit 10 controls the entire apparatus, and the communication control unit 20 processes signaling messages, such as a path message (PathMsg) and a reserve message (ResvMsg) flowing on a supervisory line.

The apparatus control unit 10 includes a user interface 11, a command processor 12, an apparatus controller 13, a fault detector 14, a database 15, and an inter-CPU communication controller 16. The user interface 11 is connected to the supervisory device 30, and the command processor 12 is connected to the user interface 11, while the apparatus controller 13 and the fault detector 14 are connected to the cross-connect unit 40. Further, the inter-CPU communication controller 16 and the command processor 12 are interconnected, the inter-CPU communication controller 16 and the apparatus controller 13 are interconnected, and the inter-CPU communication controller 16 and the fault detector 14 are interconnected. The apparatus controller 13 and the fault detector 14 are interconnected, and the command processor 12 and the fault detector 14 are interconnected.

Using the supervisory device 30, the user enters various commands, such as a path setup request for requesting the setup of a new path and an RPR path setup request for requesting the setup of a path forming a new RPR network. In the description given herein, the path forming an RPR network may be referred to as the "RPR path." Further, in the RPR path forming a ring network, the path portion extending along a section connecting between a pair of RPR stations may be referred to as the "RPR section path."

The user interface 11 receives a command from the supervisory device 30. If the command is a path setup request or an RPR path setup request, the command processor 12 passes the command to a label switching controller 22 via the inter-CPU communication controllers 16 and 21.

Various kinds of information are stored in the database 15. The information stored in the database 15 include, for example, cross-connect information, node information, connection link information, link ID registration information, and network topology information. The details of these kinds of information will be described later. The database 15 is provided so as to be accessible from the label switching controller 22 as well as from the apparatus controller 13. The fault detector 14 detects a fault occurring on the path, and notifies the apparatus controller 13.

The communication control unit 20 includes the inter-CPU communication controller 21, label switching controller 22, communication controller 23, DCC controller 24, and LAN controller 25. The inter-CPU communication controller 21 is connected to the inter-CPU communication controller 16 in the apparatus control unit 10, and the label switching controller 22 is connected to the inter-CPU communication controller 21, while the communication controller 23 is connected to the label switching controller 22.

The DCC controller 24 is connected to the communication controller 23 and the overhead termination unit 50, and controls a data communication channel (DCC). The LAN controller 25 is connected to the communication controller 23, and controls communications with other node apparatus and a remote supervisory device via a LAN.

Figure 11:
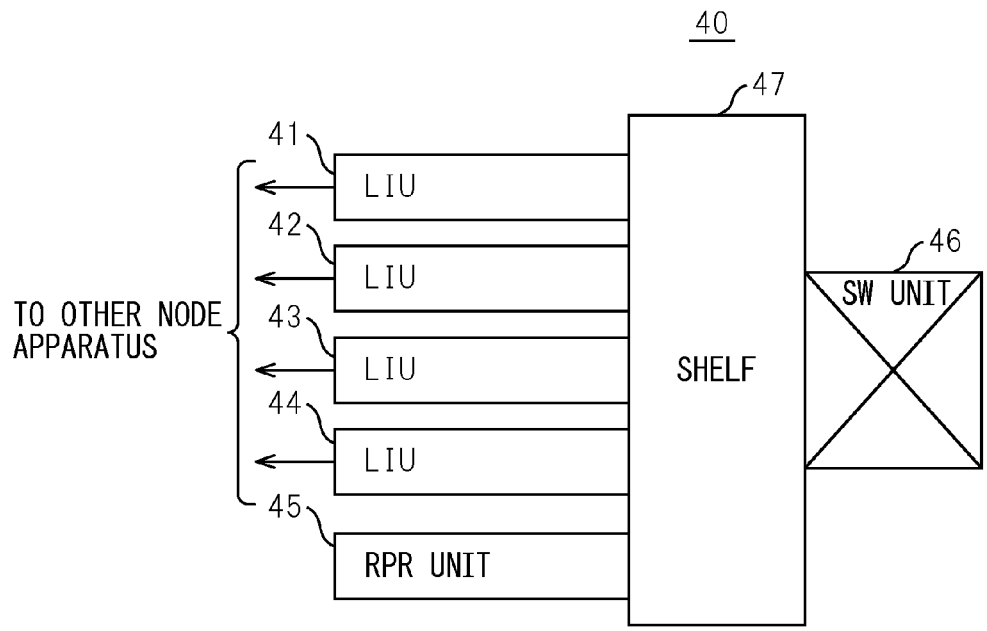
FIG. 11 is a diagram illustrating a configuration example of a cross-connect unit in FIG. 10.

FIG. 11 is a diagram illustrating a configuration example of the cross-connect unit 40 in FIG. 10. The cross-connect unit 40 includes a plurality of line interface units (LIUs) 41 to 44, an RPR unit 45, a switch unit 46, and a shelf 47.

The LIUs 41 to 44 are line interfaces for transmitting and receiving optical main signals transferred via the links, i.e., the transmission lines, connecting between the node apparatus 203A and other node apparatus. The terminals at which the transmission lines are connected to the respective LIUs 41 to 44 are termed the "ports". Each LIU may be equipped with a plurality of ports.

The RPR unit 45 is the unit that implements the function of the earlier described RPR unit. The RPR unit 45 provided in the node apparatus 203A implements the function of the RPR station 230A. The RPR unit 45 is equipped with a port PoSPort (East) connected to a link extending in the east direction of the RPR network and a port PoSPort (West) connected to a link extending in the west direction of the RPR network.

The SW unit 46 switches the connections between the input/output terminals provided on the SW unit 46. The shelf 47 is a line accommodating unit which accommodates the LIUs 41 to 44 and the RPR unit 45. The shelf 47 is provided with mounting members called "slots" into which the LIUs 41 to 44 and the RPR unit 45 are mounted.

The shelf 47 has internal electrical connections so that when the LIUs 41 to 44 and the RPR unit 45 are mounted into the respective slots of the shelf 47, the signal input/output terminals of the LIUs 41 to 44 and the RPR unit 45 are electrically connected to the respective input/output terminals of the SW unit 46. Under the direction of the apparatus controller 13, the SW unit 46 switches the connections between the input/output terminals, thereby switching the connections between the plurality of ports of the LIUs 41 to 44 and between these ports and the ports of the RPR unit 45. Or, the SW unit 46 cross-connects SONET/SDH transmission unit signals demultiplexed by the LIU, for example, STS-1 frames in the case of SONET, and passes them to the desired LIU or the RPR unit.

The SW unit 46 includes a buffer for temporarily holding signals input via the input/output terminals. Therefore, the SW unit 46 can connect any given time-division channel transmitting signals via one of the two ports connected by the SW unit 46, to any desired time-division channel transmitting signals via the other port.

In this way, the apparatus controller 13 can control, using the SW unit 46, the connections between the time-division channels transmitting signals via the ports of the respective LIUs 41 to 44. Further, the apparatus controller 13 can control, using the SW unit 46, the connections between the time-division channels transmitting signals via the ports of the LIUs 41 to 44 and the time-division channels transmitting signals via the ports of the RPR unit 45. In the description given herein, the time-division channels are referred to simply as the "channels". Further, the channel-to-channel connection made by the SW unit 46 may be referred to as the "cross-connect connection." The RPR unit 45 is mounted in the node apparatus equipped with the function of an RPR station. In the case of the network of FIG. 6, the RPR unit 45 is mounted in each of the node apparatuses 203A, 203B, and 203F. The RPR unit 45 need not be mounted in any other node apparatus.

Figure 12:
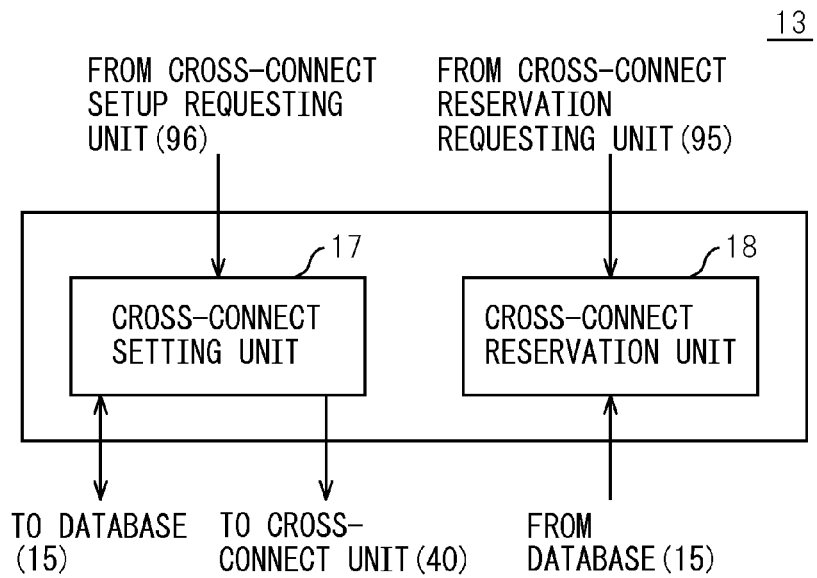
FIG. 12 is a diagram illustrating a configuration example of an apparatus controller in FIG. 10.

FIG. 12 is a diagram illustrating a configuration example of the apparatus controller 13 in FIG. 10. The apparatus controller 13 includes a cross-connect setting unit 17 and a cross-connect reservation unit 18. By controlling the setup state of the SW unit 46 in the cross-connect unit 40, the cross-connect setting unit 17 sets up the cross-connect connection to match the contents of the cross-connect information stored in the database 15.

FIG. 13 is a diagram illustrating an example of the data structure of the cross-connect information. The cross-connect information defines the mapping between the two channels to be connected by the cross-connect connection, the ports via which the signals flowing on these channels are transmitted, and the slots in which the LIUs or the RPR unit accommodating these ports are mounted. The cross-connect information further includes information that specifies the bandwidth for the channels connected by the cross-connect connection.

The cross-connect information in the illustrated example includes fields for storing "first slot," "first port," "first channel," "second slot," "second port," "second channel," and "bandwidth". For illustrative purpose, the two channels connected by the cross-connect connection are referred to as the first connection channel and the second connection channel, respectively.

The first slot specifies the slot in which is mounted the LIU or the RPR unit accommodating the port via which the signal flowing on the first connection channel is transmitted. The first port specifies, from among the ports of the LIU or the RPR unit mounted in the first slot, the port via which the signal flowing on the first connection channel is transmitted. The first channel specifies the first connection channel from among the plurality of channels transmitting signals via the first port.

The second slot specifies the slot in which is mounted the LIU or the RPR unit accommodating the port via which the signal flowing on the second connection channel is transmitted. The second port specifies, from among the ports of the LIU or the RPR unit mounted in the second slot, the port via which the signal flowing on the second connection channel is transmitted. The second channel specifies the second connection channel from among the plurality of channels transmitting signals via the second port. The bandwidth specifies the bandwidth for the channels connected by the cross-connect connection.

For example, in the case of the cross-connect connection specified by the record in the first row of the table of FIG. 13, channel "2" that transmits the signal via port "1" of the LIU or RPR unit mounted in slot "1" is connected to channel "7" that transmits the signal via port "3" of the LIU or RPR unit mounted in slot "2". The bandwidth for these channels is STS3C.

Similarly, in the case of the cross-connect connection specified, for example, by the record in the second row of the table of FIG. 13, channel "6" that transmits the signal via port "1" of the LIU or RPR unit mounted in slot "1" is connected to channel "13" that transmits the signal via port "3" of the LIU or RPR unit mounted in slot "2". The bandwidth for these channels is STS1. In the description given herein, the operation for setting up the SW unit 46 to accomplish the cross-connect connection in accordance with the cross-connect information may be referred to as the "cross-connect setup" or "cross-connection setup."

The relationship between the ports and the positions of the terminals connecting each of the LIUs 41 to 44 to the shelf 47 is known. Further, the relationship between the RPR ports and the positions of the terminals connecting the RPR unit 45 to the shelf 47 is also known. For example, a connector compatible with the connector used to connect each of the LIUs 41 to 44 to the shelf 47 may be used as the connector for connecting the RPR unit 45 to the shelf 47. The position of the terminal allocated to each RPR port may be made the same as the position of the terminal allocated to one of the ports of the LIUs 41 to 44.

It is also known which of the input/output terminals of the SW unit 46 is connected to which input/output terminal of the shelf 47. Accordingly, based on the cross-connect information, the cross-connect setting unit 17 can identify the input/output terminals of the SW unit 46 to which the two ports associated with the first and second connection channels are connected.

Turning back to FIG. 12, the cross-connect setting unit 17 provides a new cross-connect connection by adding cross-connect information to the database 15 in accordance with an instruction from a cross-connect setup requesting unit 96 to be described later. In the description given herein, changing the setup state of the SW unit 46 by adding cross-connect information to the database 15 in order to provide a new cross-connect connection may be referred to as "setting up a cross connect."

When the reservation of a new cross-connect setup is requested from a cross-connect reservation requesting unit 95 to be described later, the cross-connect reservation unit 18 checks the cross-connect information to determine whether the requested cross-connect setup is possible or not. If the requested cross-connect setup is possible, the cross-connect setup is reserved.

Next, a description will be given of the various kinds of information stored in the database 15. FIG. 14 is a diagram illustrating an example of the data structure of the node information. The node information specifies the node ID, i.e., the identifier of the node apparatus, and the node IP assigned to the node apparatus. Thus, the node information includes fields for storing "node ID" and "node IP."

FIG. 15 is a diagram illustrating a first example of the data structure of the connection link information. The connection link information is information concerning the links connected to each node apparatus. The connection link information may have the format conforming, for example, to TE-LINK defined in GMPLS extensions. The example of FIG. 15 illustrates the connection link information stored in the database 15 maintained in the node apparatus 203A.

In the connection link information, information concerning the RPR ports, i.e., the ports of the RPR station 230A provided in the node apparatus 203A, is also stored as the information concerning the links connected to the node apparatus 203A. The connection link information is updated by a user setup operation when a new link is connected to the node apparatus 203A or when a new RPR station is provided in the node apparatus 203A.

The connection link information includes fields for storing "link ID," "link type," "ring ID," "remote node ID," "remote node IP," and "remote node link ID."

In the case of a record concerning a link connected to a LIU port from another node apparatus, the values of the link ID, link type, remote node ID, remote node IP, and remote node link ID have meaning, and the value of the ring ID is not set. In this case, the link ID assigned as the identifier of the link is specified as the link ID. The link type has a value "Normal" which means a normal link. The node ID and node IP of the node apparatus at the other end of the connection are specified as the remote node ID and the remote node IP. The link ID assigned at the remote node apparatus is specified as the remote node link ID.

For example, in the case of the record in which the value of the link ID is "1", the value of the link type is "Normal" which means that the record concerns a normal link connected to a LIU port from another node apparatus. The remote node apparatus connected to the node apparatus 203A by the link whose link ID value is "1" has a node ID "2.2.2.2" and a node IP "10.5.20.12". This link is assigned a link ID "2" at the remote node apparatus.

In the case of a record concerning an RPR port, the values of the link ID, link type, and ring ID have meaning, and the values of the remote node ID, remote node IP, and remote node link ID are not set. In this case, as in the case of a normal link, the link ID assigned to the RPR port is specified as the link ID. The link IDs of the RPR ports of the RPR stations provided in the node apparatuses 203A, 203B, and 203F are also carried in FIG. 9.

The link type has a value "FoSPort (East)" or "FoSPort (West)" which indicates whether the RPR port is FoSPort (East) or FoSPort (West). The ring ID of the RPR network in which the RPR port is used is specified as the ring ID.

FIG. 16 is a diagram illustrating an example of the data structure of the link ID registration information. For each link whose link ID is defined in the connection link information, the link ID registration information stores the port to which the link is connected and the slot of the shelf 47 in which the LIU, 41 to 44, accommodating that port is mounted. The link ID registration information is set by the user when a new link is provided for the node apparatus 203A.

As earlier noted, the relationship between the ports and the positions of the terminals connecting each of the LIUs 41 to 44 to the shelf 47 is known. Accordingly, by referring to the link ID registration information, the cross-connect setting unit 17 can identify which terminal in which slot of the shell 47 is to be cross-connected to set up the cross-connect connection to the link.

The link ID registration information also stores the slot of the shelf 47 in which the RPR unit 45 having RPR ports whose link IDs are defined in the connection link information is mounted, and the port numbers assigned to the respective RPR ports. The link ID registration information is set by the user when a new RPR station is provided in the node apparatus 203A.

The relationship between the RPR ports and the positions of the terminals connecting the RPR unit 45 to the shelf 47 is known. Accordingly, by referring to the link ID registration information, the cross-connect setting unit 17 can identify which terminal in which slot of the shell 47 is to be cross-connected to set up the cross-connect connection to the RPR port.

FIG. 17 diagram illustrating a first example of the data structure of the network topology information. The network topology information is information concerning the links existing in the network 210. The network topology information includes fields for storing "node ID," "link ID," "link type," "ring ID," "remote node ID," and "remote node link ID."

Similarly to the connection link information of FIG. 15, the network topology information includes the records concerning the RPR ports of the RPR station in addition to the records concerning the normal links connecting between the respective node apparatuses 203A to 203F. Accordingly, the record concerning each RPR port is carried in a record similar to the one carrying the information concerning each link connected to the node apparatus equipped with a corresponding port, and is stored in the network topology information.

In the case of a record concerning a link connecting between node apparatuses, the values of the node ID, link ID, link type, remote node ID, and remote node link ID have meaning, and the value of the ring ID is not set. In this case, the node ID of the node apparatus whose ring ID is assigned to the link is specified as the node ID. Further, the link ID defined in the connection link information of FIG. 15 is specified as the link ID. The link type has a value "Normal" which means the record is a record concerning a normal link. The same value as the remote node ID specified for the link in the connection link information of FIG. 15 is specified as the value of the remote node ID. The link ID assigned at the remote node apparatus is specified as the remote node link ID.

In the case of a record concerning an RPR port, the values of the node ID, link ID, link type, and ring ID have meaning, and the values of the remote node ID and remote node link ID are not set. In this case, the node ID of the node apparatus accommodating the RPR port is specified as the node ID. Further, the link ID defined in the connection link information of FIG. 15 is specified as the link ID. The link type has a value "FoSPort (East)" or "FoSPort (West)" which indicates whether the RPR port is FoSPort (East) or FoSPort (West). The ring ID of the RPR network in which the RPR port is used is specified as the ring ID.

Figure 18:
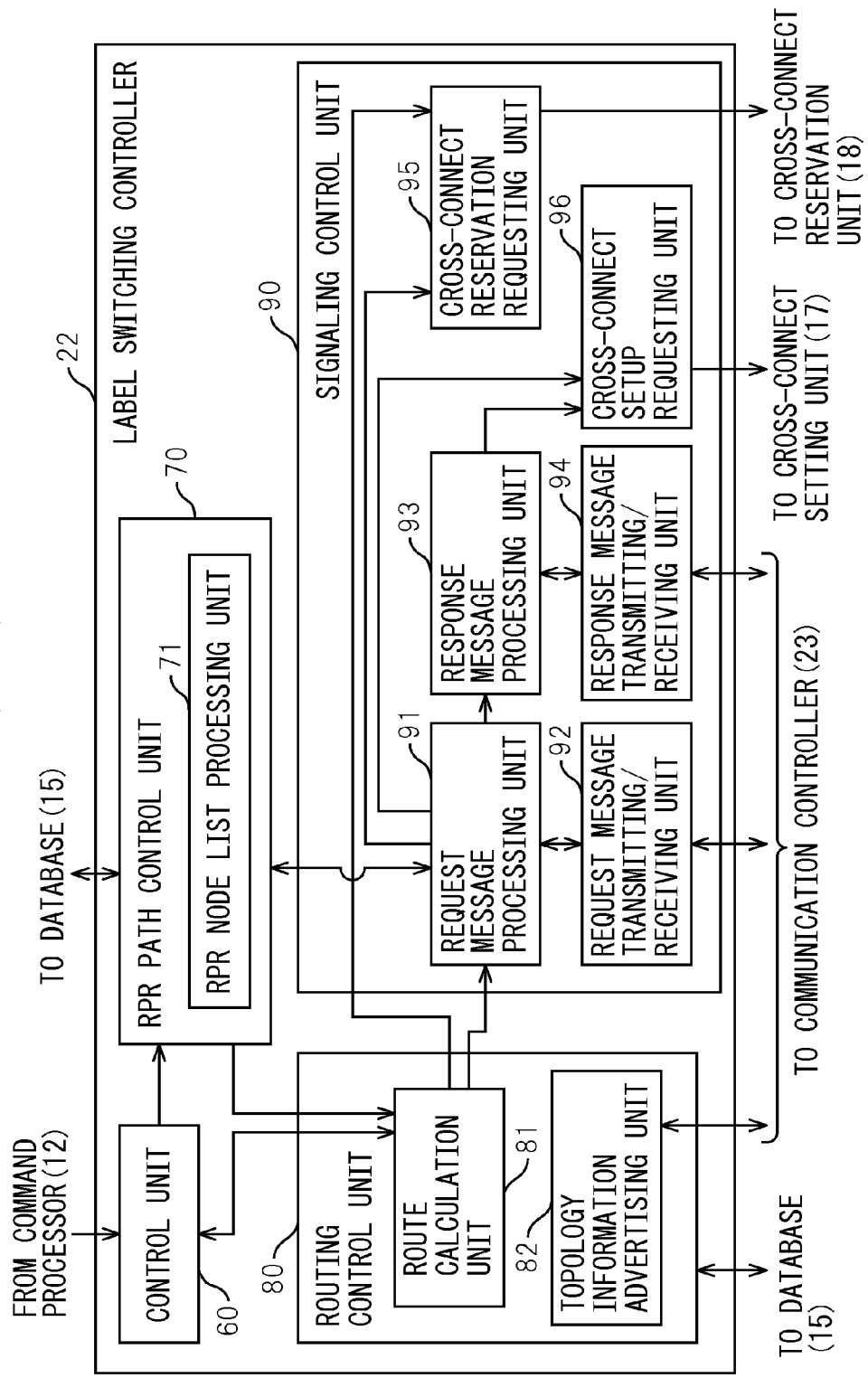
FIG. 18 is a diagram illustrating a configuration example of a label switching controller in FIG. 10.

FIG. 18 is a diagram illustrating a configuration example of the label switching controller 22 in FIG. 10. The label switching controller 22 includes a control unit 60, an RPR path control unit 70, a routing control unit 80, and a signaling control unit 90. The control unit 60 controls the entire operation of the label switching controller 22. The control unit 60 receives a user command, such as a path setup request or an RPR path setup request, from the command processor 12. The RPR path control unit 70 and the routing control unit 80 perform processing for the requested path setup under the control of the control unit 60.

The RPR path control unit 70 performs processing for setting up an RPR network path passing through the node apparatus 203A in accordance with a routing protocol implemented by the routing control unit 80 and a signaling protocol implemented by the signaling control unit 90.

The RPR path control unit 70 includes an RPR node list processing unit 71. The RPR node list processing unit 71, based on the network topology information of FIG. 17, creates an RPR node list for the node apparatuses equipped with RPR ports in the communication network 210 by excluding the node apparatus 203A.

Further, when a PathMsg is received that requests the setup of an RPR section path specifying the node apparatus 203A as the egress node apparatus, the RPR node list processing unit 71 updates the RPR node list. By updating the RPR node list, the node apparatus 203A is deleted from the RPR node list included in the PathMsg.

The routing control unit 80 performs processing for routing. The processing for routing includes calculating the route for the path to be set up and exchanging the network topology information among the node apparatuses 203A to 203F. The routing control unit 80 includes a route calculation unit 81 and a topology information advertising unit 82. The routing by the routing control unit 80 may be performed in accordance with a routing protocol defined, for example, by OSPF-TE (Open Shortest Path First-Traffic Engineering).

The route calculation unit 81 calculates the route from the node apparatus 203A to the node apparatus located at the shortest distance among the node apparatuses included in the RPR node list created or updated by the RPR node list processing unit 71. Further, the route calculation unit 81 acquires from the network topology information of FIG. 17 the link ID of the port FoSPort (West) of the RPR station provided in the node apparatus located at the shortest distance. The route calculation unit 81 calculates the node apparatus located at the shortest distance and the route to that node apparatus by using a certain calculation method, such as Dijkstra's algorithm.

The route from the port FoSPort (East) of the RPR station 230A provided in the node apparatus 203A to the port FoSPort (West) of the RPR station provided in the node apparatus located at the shortest distance is calculated as the route for the RPR section path between the RPR station provided in the node apparatus 203A and the RPR station provided in the node apparatus located at the shortest distance. The route calculation unit 81 creates routing information ERO for the RPR section path. The route calculation unit 81 supplies the created ERO to a request message processing unit 91 in the signaling control unit 90.

The RPR path setup request from the user may include the specification of the route via which to route the RPR path. In this case, the route calculation unit 81 creates the ERO that matches the user specified route and supplies it to the request message processing unit 91.

Further, the route calculation unit 81 instructs the cross-connect reservation requesting unit 95 (to be described later) to reserve the setup of a cross-connect for connecting between the FoSPort (East) of the RPR station 230A and the link leading to the adjacent node apparatus specified by the ERO.

The topology information advertising unit 82 distributes the link information of the node apparatus 203A of FIG. 15 to the other node apparatuses 203B to 203F. Further, the topology information advertising unit 82 receives the link information distributed from the other node apparatuses 203B to 203F and, based on the received link information and the link information of the node apparatus 203A, creates network topology information such as depicted in FIG. 17. Next, a description will be given of an embodiment of the link information advertising method when the routing is performed in accordance with the routing protocol defined by OSPF-TE.

Figure 19A:
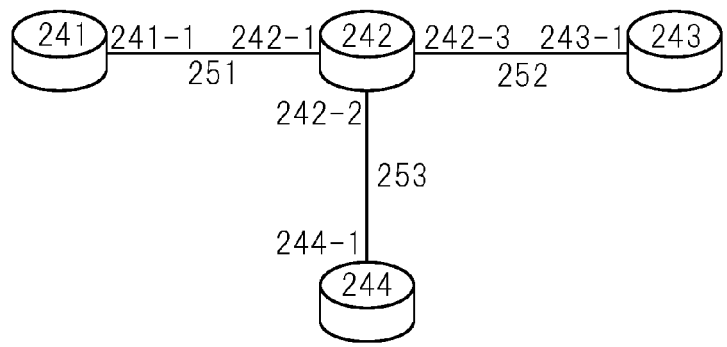
FIG. 19A is a diagram illustrating a network configuration which is used for the explanation of LSA information.
Figure 19B:
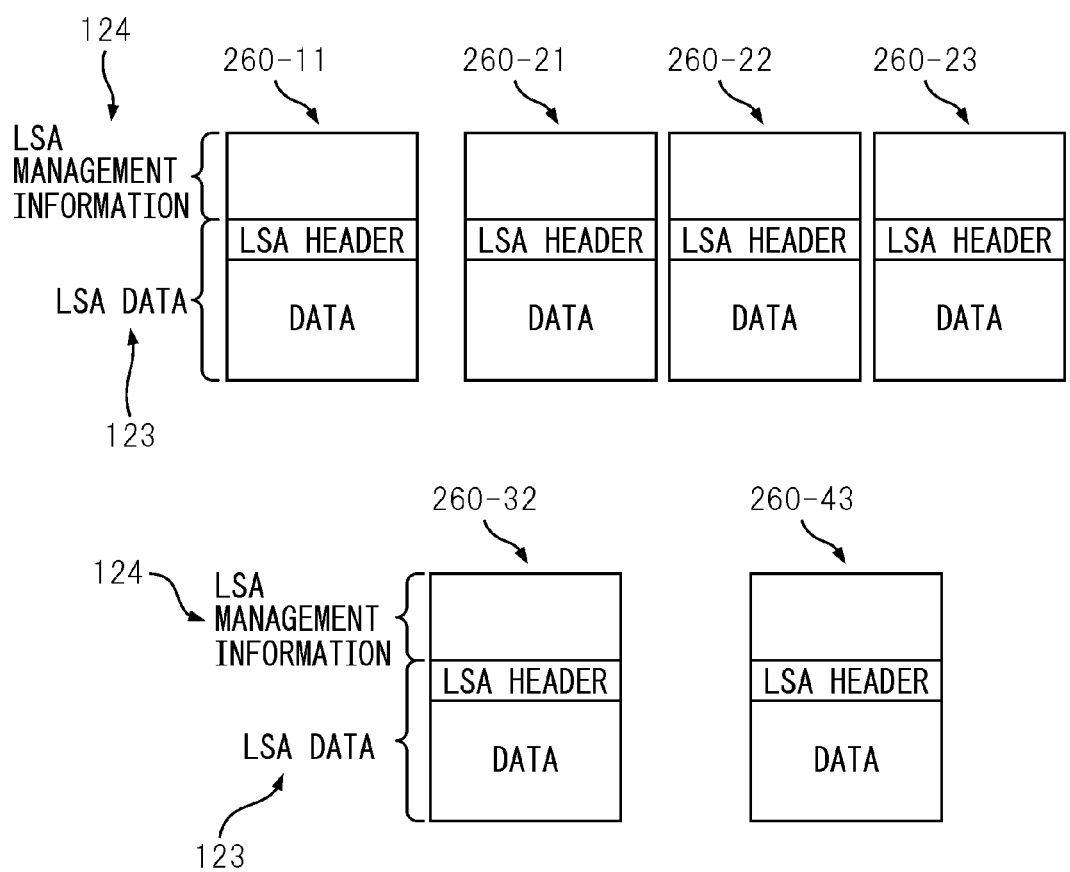
FIG. 19B is an explanatory diagram illustrating an example of the LSA information for the network of FIG. 19A.

The topology information advertising unit 82 exchanges the link information in the form of link-state advertising (LSA) information with the other node apparatuses 203B to 203F. FIG. 19A is a diagram illustrating a network configuration which is used for the explanation of the LSA information, and FIG. 19B is an explanatory diagram illustrating an example of the LSA information for the network of FIG. 19A.

The network depicted in FIG. 19A is constructed from four nodes 241 to 244; here, the nodes 241 and 242 are connected by a link 251, the nodes 242 and 243 are connected by a link 252, and the nodes 242 and 244 are connected by a link 253. Further, an interface 241-1 on the node 241 is connected to the link 251; likewise, interfaces 242-1, 242-2, and 242-3 on the node 242 are connected to the links 251, 253, and 252, respectively, and an interface 243-1 on the node 243 is connected to the link 252, while an interface 244-1 on the node 244 is connected to the link 253.

The LSA information stored in each node includes LSA data proper 123 and LSA management information 124 for managing the LSA data, and the LSA data 123 is created for each of the nodes 241 to 244 and for each of the links connected to these nodes.

For example, data 260-11 includes the LSA data concerning the link 251 connected to the node 241 and the LSA management information for that data; likewise, data 260-21 to 260-23 each include the LSA data concerning a corresponding one of the links 251 to 253 connected to the node 242 and the LSA management information for that data, and data 260-32 includes the LSA data concerning the link 252 connected to the node 243 and the LSA management information for that data, while data 260-43 includes the LSA data concerning the link 253 connected to the node 244 and the LSA management information for that data. The nodes exchange the LSA information concerning the links connected to the respective nodes, and thus the set of LSA information 260-11 to 260-43 concerning all the nodes is stored in each of the nodes 241 to 244.

Figure 20:
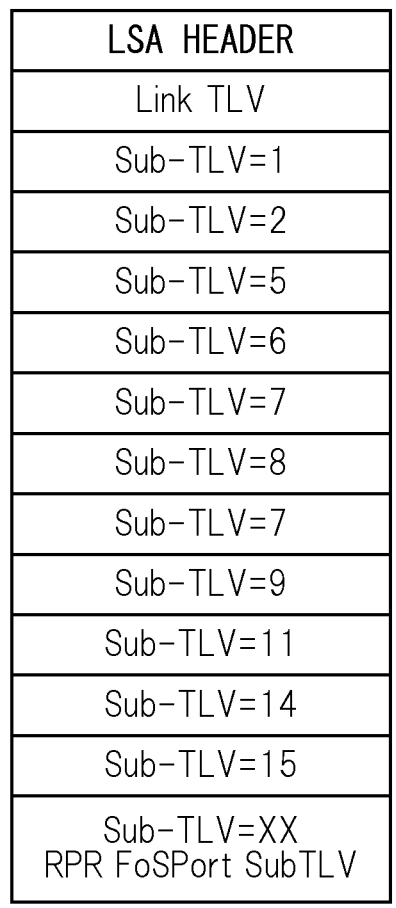
FIG. 20 is a diagram illustrating an example of the data structure of the LSA data of FIG. 19B.

FIG. 20 is a diagram illustrating an example of the data structure of the LSA data of FIG. 19B. The LSA data includes an LSA header as a common header containing LSA identification information, type, etc., and other fields for storing Link TLV describing the link and Sub-TLV describing additional information. When creating the LSA data advertising the link information concerning an RPR port, the topology information advertising unit 82 adds RPR FoSPort SubTLV to the LSA data.

Figure 21:
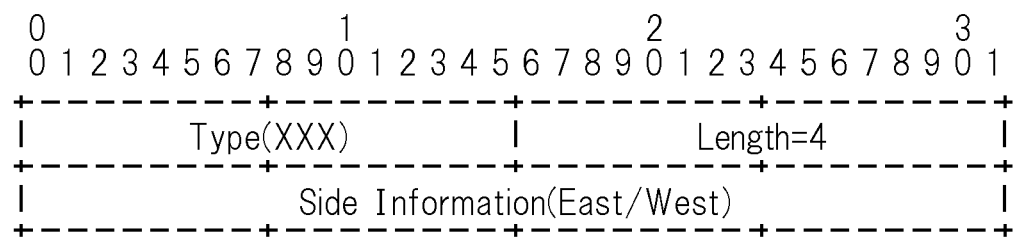
FIG. 21 is a diagram illustrating a first example of the data structure of RPR FoSPort SubTLV depicted in FIG. 20.

FIG. 21 is a diagram illustrating a first example of the data structure of the RPR FoSPort SubTLV depicted in FIG. 20. The RPR FoSPort SubTLV includes fields for storing "Type", "Length", and "Side Information." Type specifies an identification code indicating that the Sub-TLV is RPR FoSPort SubTLV. Length specifies the data length of the RPR FoSPort SubTLV. Side Information specifies whether the RPR port specified by the LSA data is FoSPort (East) or FoSPort (West).

By advertising the LSA data to which such RPR FoSPort SubTLV has been added, the LSA information concerning the RPR ports of all the RPR stations existing in the communication network 210 is distributed to all the node apparatuses 203A to 203F. As a result, the link information concerning the RPR ports of all the RPR stations existing in the communication network 210 is stored in the network topology information of each of the node apparatuses 203A to 203F.

Reference is again made to FIG. 18. The signaling control unit 90 performs signaling for setting up the path specified by the ERO created by the route calculation unit 81. The signaling by the signaling control unit 90 may be performed in accordance with a signaling protocol defined, for example, by RSVP-TE (Resource Reservation Protocol-Traffic Engineering). The signaling control unit 90 includes the request message processing unit 91, request message transmitting/receiving unit 92, response message processing unit 93, response message transmitting/receiving unit 94, cross-connect reservation requesting unit 95, and cross-connect setup requesting unit 96.

Figure 22:
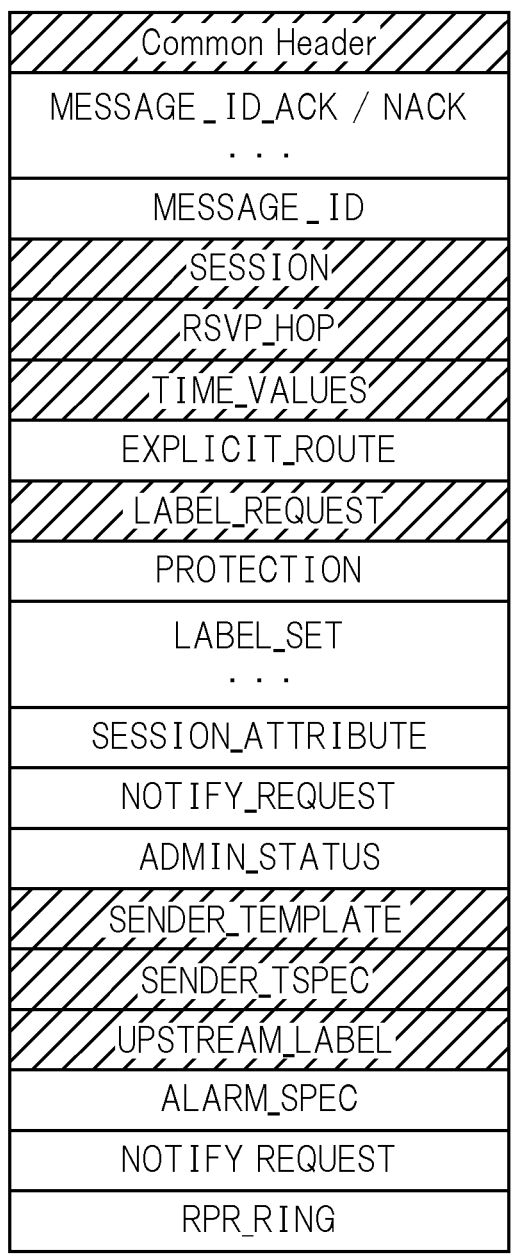
FIG. 22 is a diagram illustrating the data structure of a path message for requesting the setup of an RPR section path.

When requesting the setup of an RPR section path, the request message processing unit 91 generates a PathMsg by including therein the ERO created by the route calculation unit 81 and the RPR node list created by the RPR node list processing unit 71. The request message processing unit 91 passes the thus generated PathMsg to the request message transmitting/receiving unit 92 which transmits the PathMsg to the next destination node apparatus specified by the ERO. FIG. 22 is a diagram illustrating the data structure of the path message (PathMsg) for requesting the setup of an RPR section path.

Figure 1:
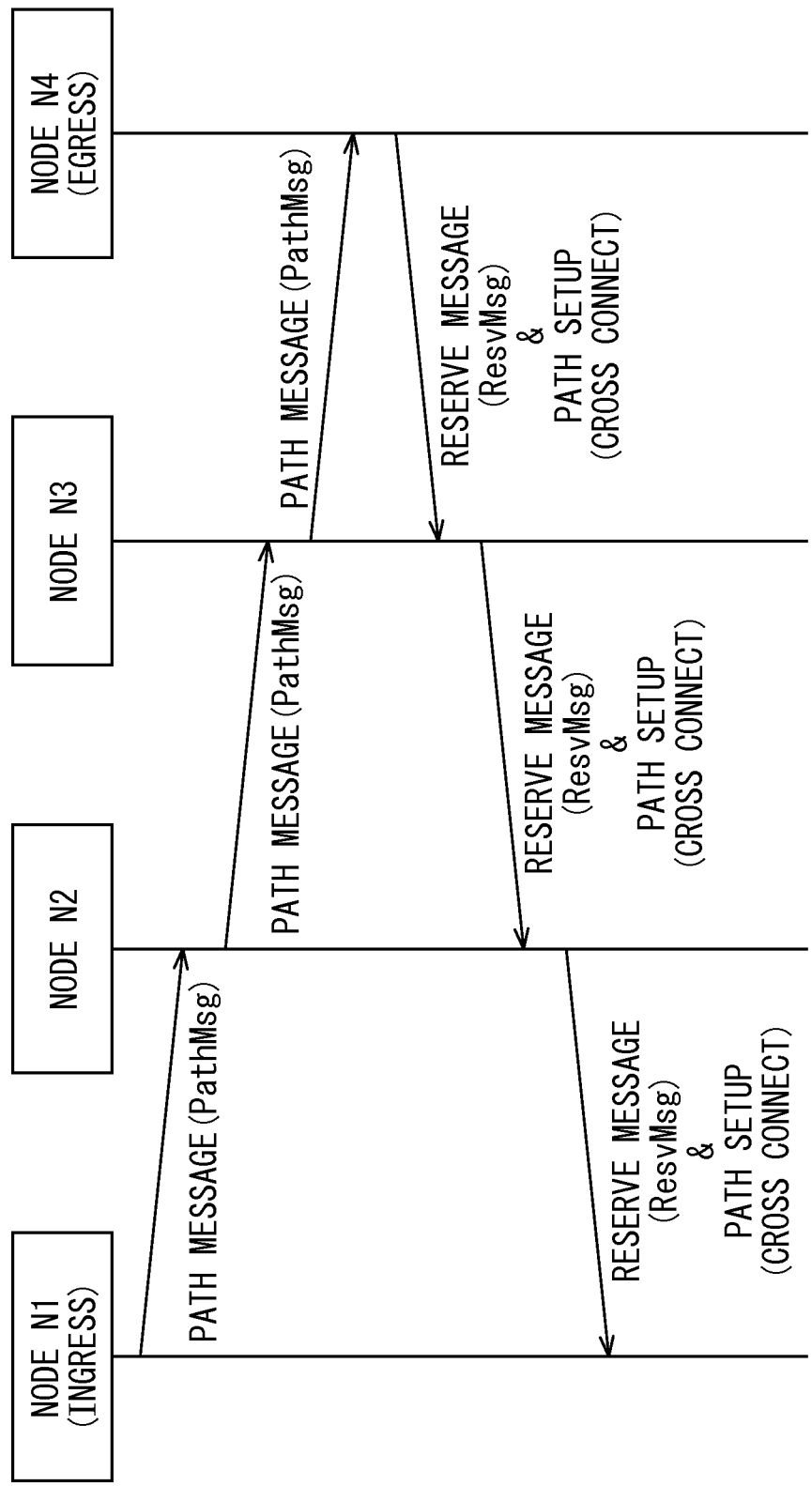
FIG. 1 is a diagram illustrating an example of a path generation sequence in GMPLS.
Figure 2:
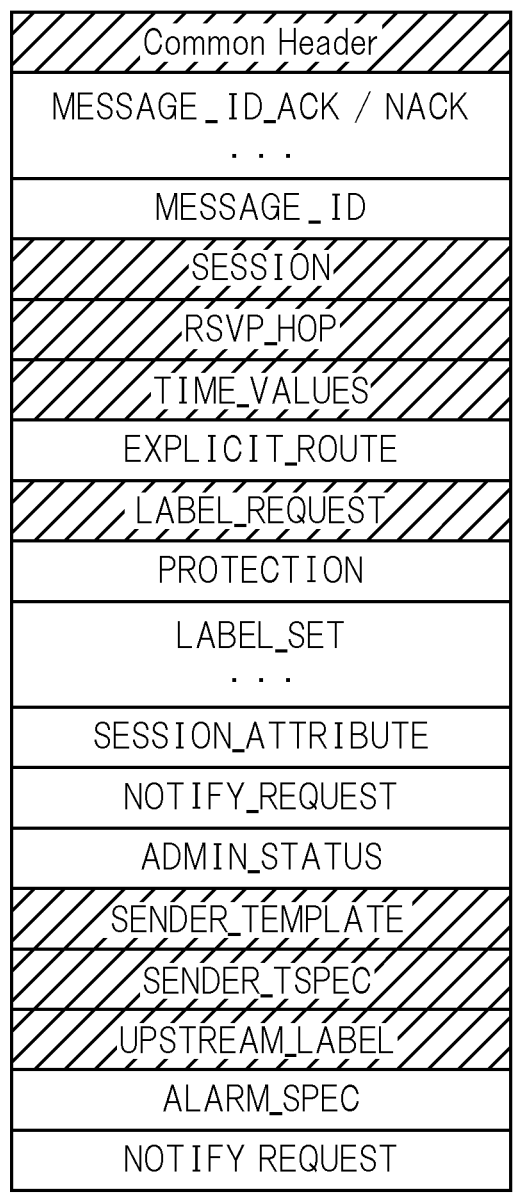
FIG. 2 is a diagram illustrating the data structure of a path message.
Figure 3:
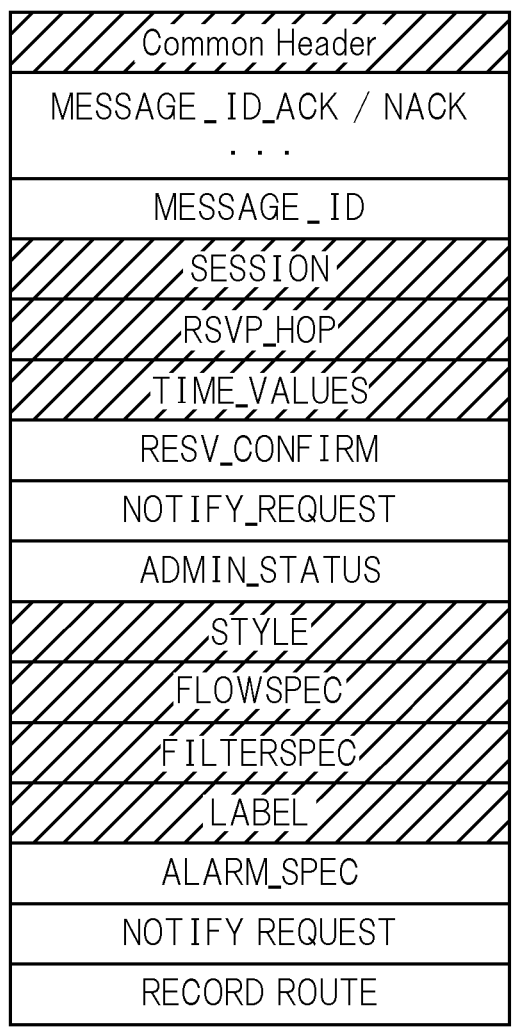
FIG. 3 is a diagram illustrating the data structure of a reserve message.
Figure 4:
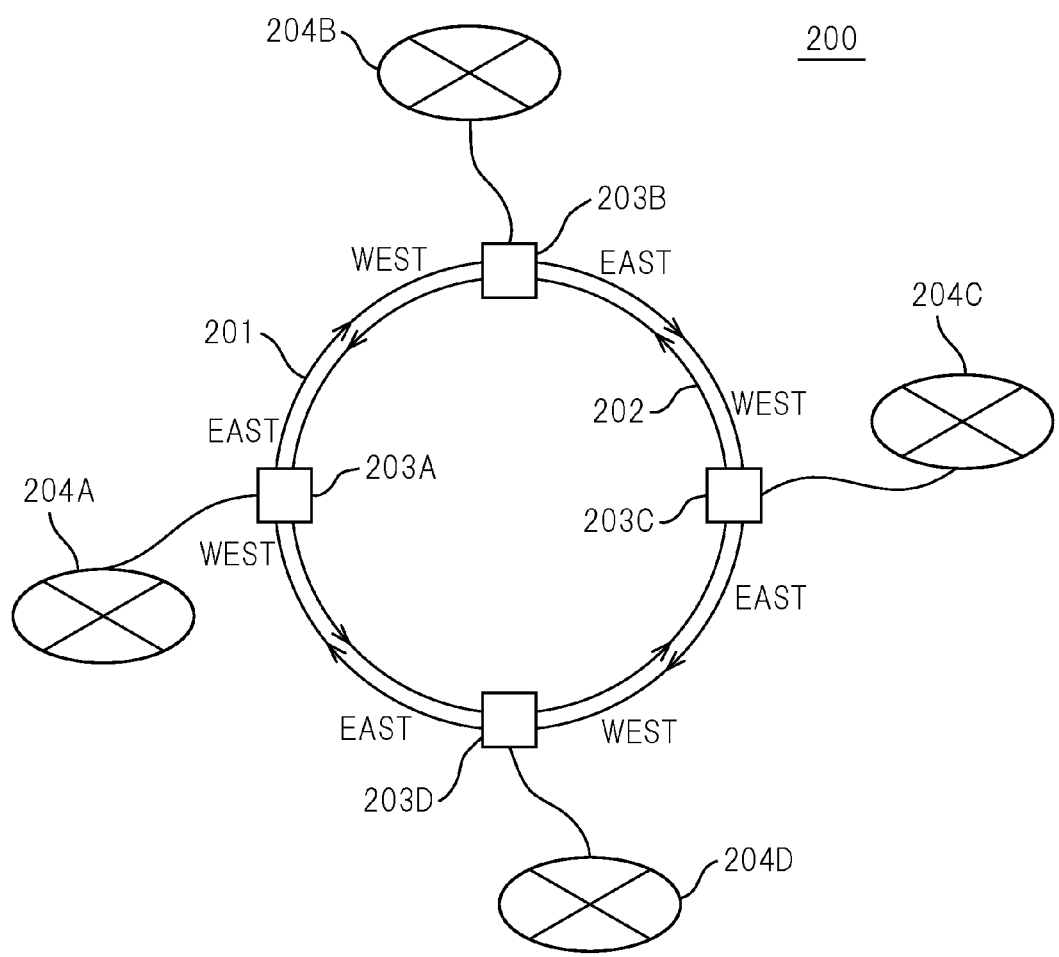
FIG. 4 is a diagram illustrating an example of an RPR network.
Figure 5:
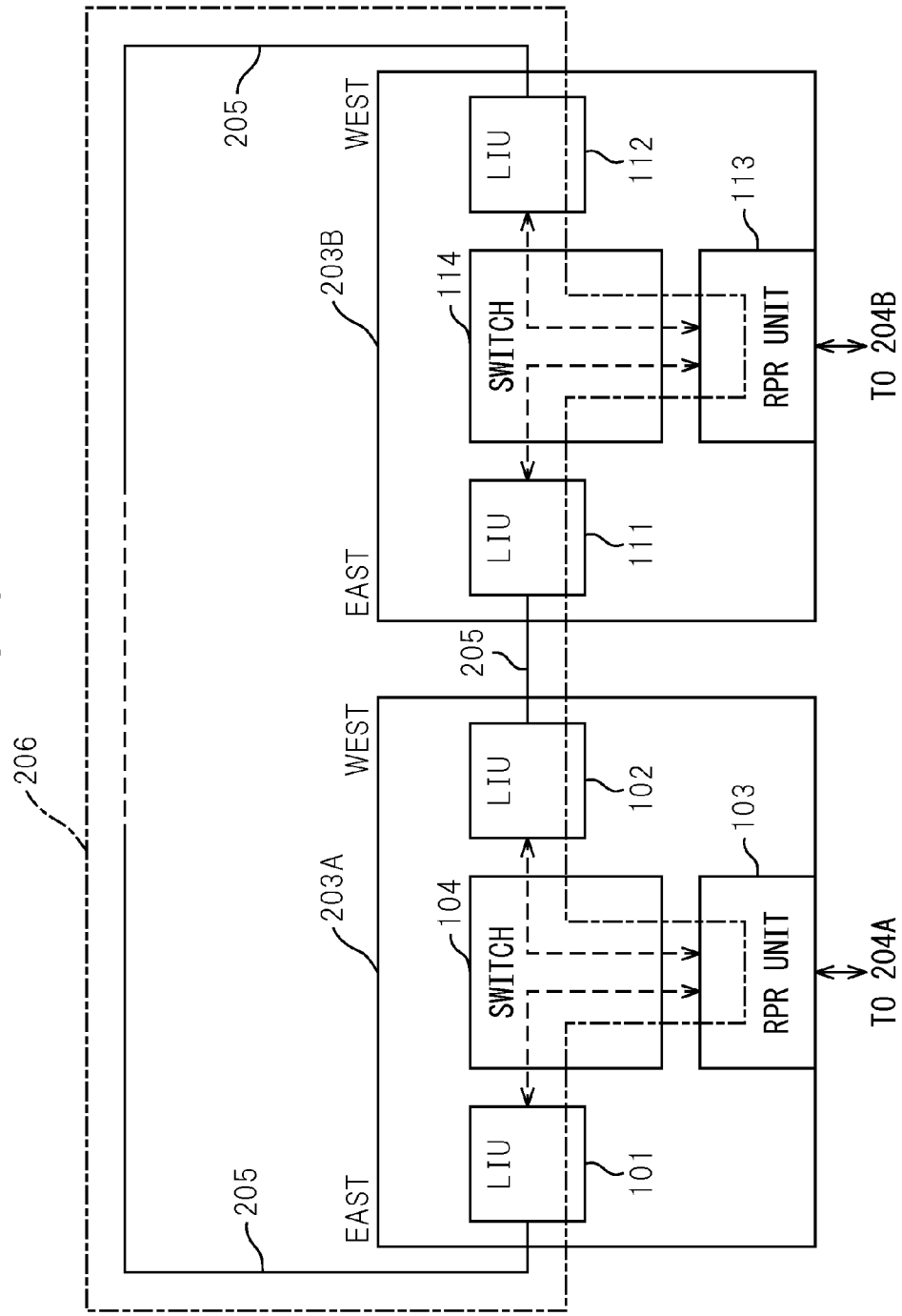
FIG. 5 is a diagram illustrating a condition in which a cross connect that matches a path forming the RPR network is set within each node apparatus equipped with an RPR unit.
Figure 23:
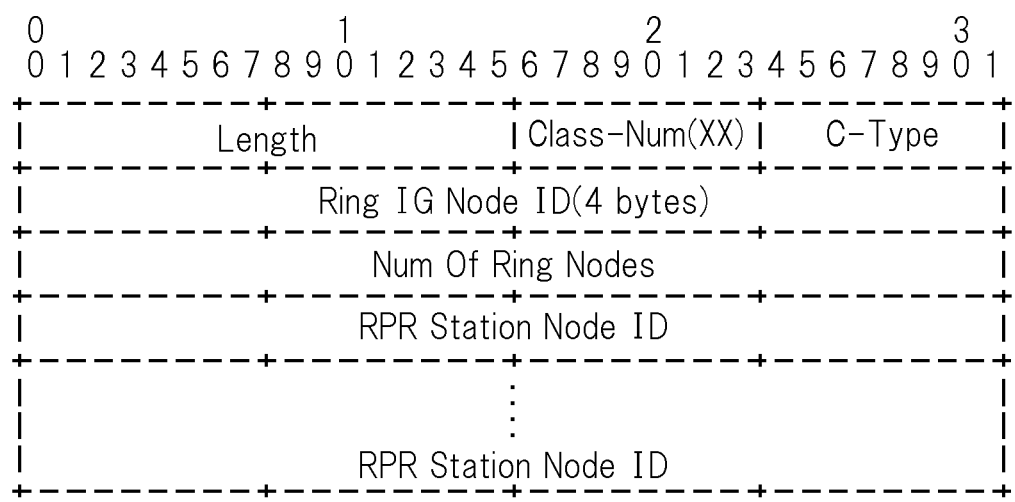
FIG. 23 is a diagram illustrating a first example of the data structure of an RPR_RING object depicted in FIG. 22.

The PathMsg illustrated in FIG. 22 includes a field for storing an RPR_RING object, in addition to the data fields depicted in FIG. 2. FIG. 23 is a diagram illustrating a first example of the data structure of the RPR_RING object depicted in FIG. 22. The RPR_RING object includes fields for storing "Length", "Class-Num", "C-Type", "Ring IG Node ID," "Num Of Ring Nodes," and "RPR Station Node ID." Length specifies the object length. Class-Num and C-Type specify the object class/type.

Ring IG Node ID specifies the node ID of the node apparatus that received the RPR path setup request from the user. In the description given herein, the node apparatus that received the RPR path setup request may be referred to as the "RPR-IG node apparatus."

Num Of Ring Nodes and RPR Station Node ID specify the list of the node apparatuses contained in the RPR network. Num Of Ring Nodes specifies the number of node apparatuses included in the list, and each row of RPR Station Node ID specifies one node apparatus included in the list. The RPR node list created by the RPR node list processing unit 71 is included in the RPR_RING object in the form of Num Of Ring Nodes and RPR Station Node ID.

In FIG. 18, when the PathMsg is received by the request message transmitting/receiving unit 92, the request message processing unit 91 instructs the cross-connect reservation requesting unit 95 to reserve the setup of a cross-connect in the node apparatus 203A that is contained in the route specified by the ERO included in the PathMsg.

When the egress node apparatus specified in the PathMsg received by the request message transmitting/receiving unit 92 is the node apparatus 203A, the request message processing unit 91 instructs the cross-connect setup requesting unit 96 to set up the cross connect in the node apparatus 203A. At the same time, the request message processing unit 91 instructs the response message processing unit 93 to generate a ResvMsg for responding to the PathMsg.

When the PathMsg received by the request message transmitting/receiving unit 92 is a message that requests the setup of an RPR section path and that specifies the node apparatus 203A as the egress node apparatus, the request message processing unit 91 instructs the RPR node list processing unit 71 to update the RPR node list included in the PathMsg. At the same time, the request message processing unit 91 creates a PathMsg by including therein the updated RPR node list and the ERO that specifies the route for the next RPR section path that the path calculation unit 81 has calculated in accordance with the list. The thus created PathMsg is transmitted from the request message transmitting/receiving unit 92 toward the egress node of the next RPR section path.

The request message transmitting/receiving unit 92 performs processing for the transmission/reception and transfer of the PathMsg. The response message transmitting/receiving unit 94 performs processing for the transmission/reception and transfer of the ResvMsg.

When the ResvMsg is received by the response message transmitting/receiving unit 94, the response message processing unit 93 instructs the cross-connect setup requesting unit 96 to set up the cross connect in the node apparatus 203A as reserved by the processing of the PathMsg. Further, when the PathMsg is received that specifies the node apparatus 203A as the egress node apparatus, the response message processing unit 93 generates the ResvMsg for responding to the PathMsg.

In accordance with the instructions from the route calculation unit 81 and the request message processing unit 91, the cross-connect reservation requesting unit 95 requests the cross-connect reservation unit 18 to reserve the setup of the cross connect. In accordance with the instructions from the request message processing unit 91 and the response message processing unit 93, the cross-connect setup requesting unit 96 requests the cross-connect setting unit 17 to set up the cross connect.

When instructing the cross-connect setting unit 17 in FIG. 12 to set up the cross connect, the cross-connect setup requesting unit 96 may specify, by using link IDs, the links or the RPR ports between which the cross-connect connection is to be set up. By referring to the link ID registration information of FIG. 16, the cross-connect setting unit 17 identifies the ports to which the two links to be cross-connected are connected and the slots of the shelf 47 in which the units accommodating these ports are mounted. The cross-connect setting unit 17 stores the thus identified slots and ports in the cross-connect information.

Figure 24:
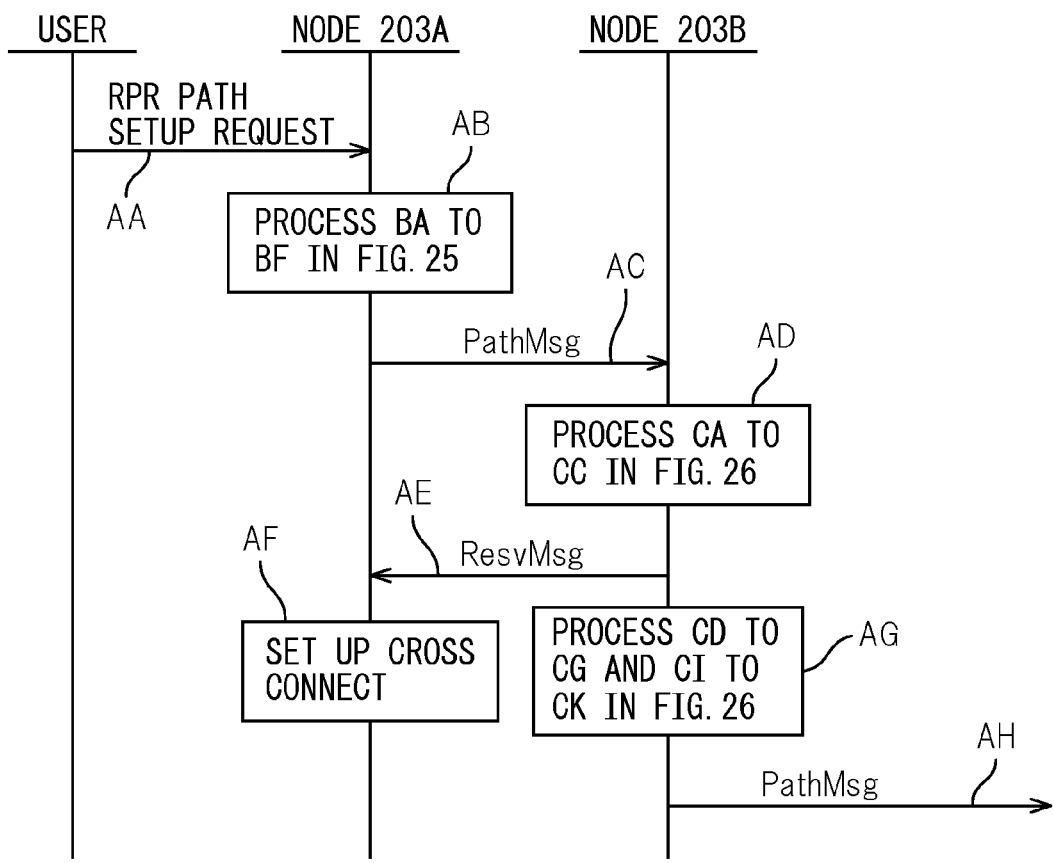
FIG. 24 is a diagram illustrating the signaling performed between the node apparatuses 203A and 203B in the network of FIG. 6.

Next, a description will be give of how an RPR path is set up in the network disclosed herein. FIG. 24 is a diagram illustrating the signaling performed between the node apparatuses 203A and 203B in the network of FIG. 6. In an alternative embodiment, the following operations AA to AH may be implemented as steps.

In operation AA, the supervisory device 30 in response to a user operation transmits to the node apparatus 203A an RPR path setup request for requesting the setup of a new RPR path. The node apparatus 203A that received the RPR path setup request is thus the RPR-IG node apparatus.

Figure 25:
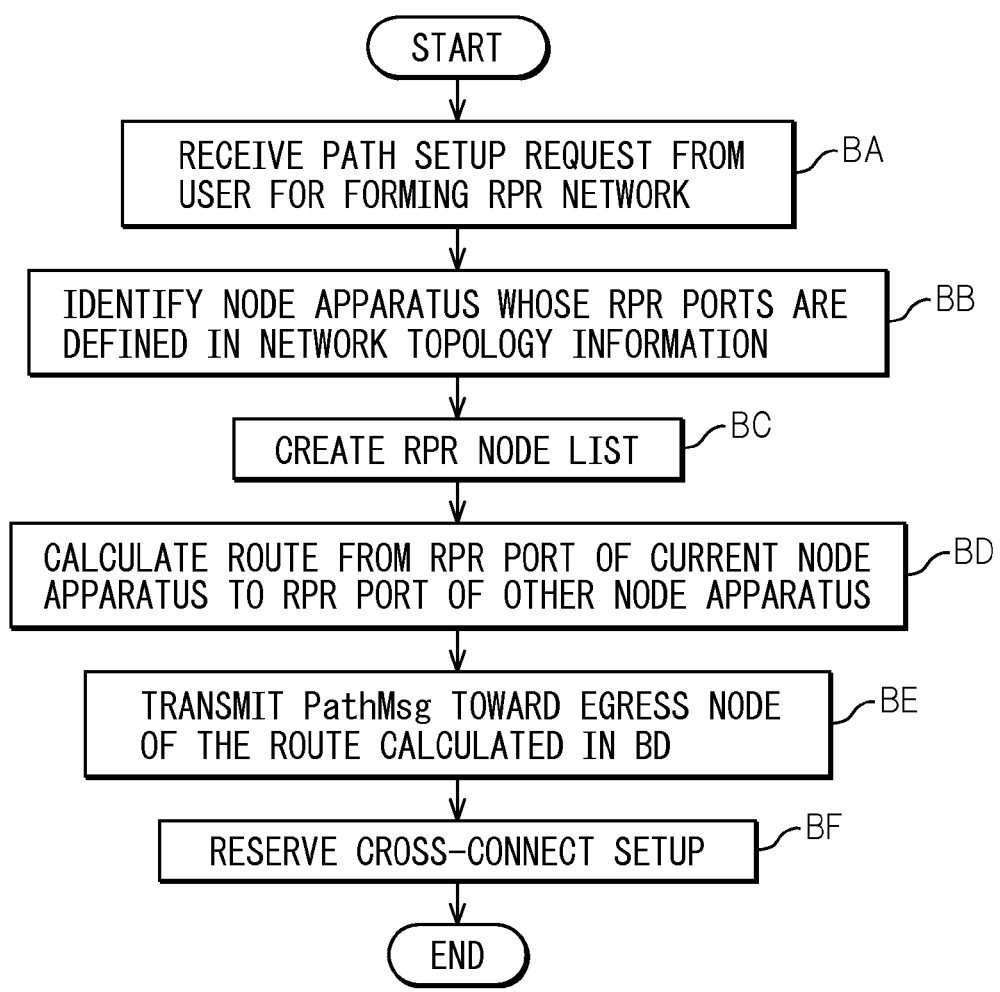
FIG. 25 is a diagram illustrating a first example of the process performed by the node apparatus that received a request for setting up a path forming an RPR network.

In operation AB, the node apparatus 203A that received the RPR path setup request from the user performs operations BA to BF described hereinafter with reference to FIG. 25. FIG. 25 is a diagram illustrating a first example of the process performed by the node apparatus that received the request for setting up a path forming an RPR network. In an alternative embodiment, the following operations BA to BF may be implemented as steps.

In operation BA, the node apparatus 203A receives the RPR path setup request from the user via the user interface 11 in FIG. 10. In operation BB, the RPR node list processing unit 71 in FIG. 18 identifies all the node apparatuses equipped with RPR ports in the communication network 210 by referring to the network topology of FIG. 17.

In operation BC, the RPR node list processing unit 71 creates an RPR node list for the node apparatuses equipped with RPR ports by excluding the node apparatus 203A. In the present embodiment, the node apparatuses 203A, 203B, and 203F are equipped with RPR ports; therefore, the node apparatuses 203B and 203F are included in the RPR node list.

In operation BD, the route calculation unit 81 calculates the route from the node apparatus 203A to the node apparatus located at the shortest distance among the node apparatuses included in the RPR node list created by the RPR node list processing unit 71. In the example of the communication network 210 of FIG. 6, it is assumed that the node apparatus 203B is identified as the node apparatus located at the shortest distance, and that the route "203A to 203B" is calculated as the shortest route from the node apparatus 203A to the node apparatus 203B.

The route calculation unit 81 acquires from the network topology information the link ID of the port FoSPort (West) of the RPR station 230B provided in the node apparatus 203B located at the shortest distance. The route calculation unit 81 creates routing information ERO that specifies the route for the RPR section path leading from the RPR port FoSPort (East) of the RPR station 230A provided in the node apparatus 203A to the RPR port FoSPort (West) of the RPR station 230B along the above shortest route. The node apparatus 203B is thus the egress node apparatus of this RPR section path.

In operation BE, the request message processing unit 91 creates a PathMsg. The PathMsg includes the ERO created by the route calculation unit 81 and the RPR_RING object depicted in FIG. 23. The RPR_RING object includes the RPR node list created by the RPR node list processing unit 71 and the specification of the RPR-IG node apparatus 203A. As described earlier, the node apparatuses included in the RPR node list are the node apparatuses 203B and 203F, so the value of Num Of Ring Nodes is set to "2". The request message transmitting/receiving unit 92 transmits the PathMsg toward the egress node apparatus 203B.

In operation BF, the route calculation unit 81 instructs the cross-connect reservation requesting unit 95 (to be described later) to reserve the setup of a cross-connect for forming a path connecting between the FoSPort (East) of the node apparatus 203A and the link 220A1 leading to the adjacent node apparatus 203B along the route of the RPR section path. In accordance with the instruction from the route calculation unit 81, the cross-connect reservation requesting unit 95 requests the cross-connect reservation unit 18 to reserve the setup of the cross connect.

Reference is made to FIG. 24. In operation AC, the PathMsg is transmitted from the node apparatus 203A to the node apparatus 203B. In operation AD, the node apparatus 203B that received the PathMsg performs following operations CA to CC described hereinafter with reference to FIG. 26.

Figure 26:
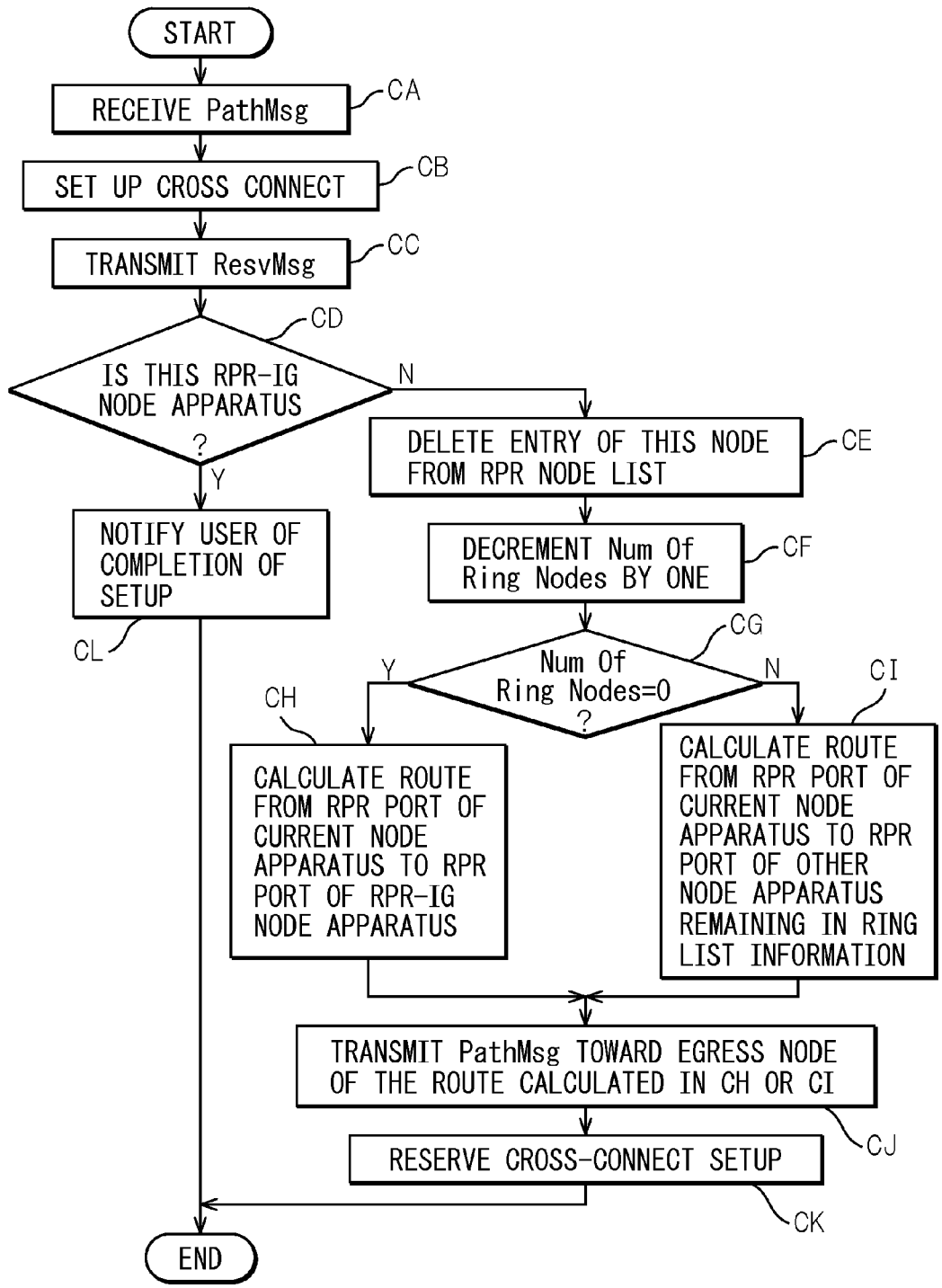
FIG. 26 is a diagram illustrating an example of the process performed by an egress node apparatus that received the path message.

FIG. 26 is a diagram illustrating an example of the process performed by the egress node apparatus that received the path message (PathMsg). In an alternative embodiment, the following operations CA to CK may be implemented as steps.

In operation CA, the request message transmitting/receiving unit 92 receives the PathMsg. Since the node apparatus 203B is the egress node apparatus of the RPR section path to be set up by the PathMsg, in operation CB the request message processing unit 91 instructs the cross-connect setup requesting unit 96 to set up the cross connect in the node apparatus 203B.

The path to be set up by this cross-connect setup is the path for connecting between the link 220B1 leading from the adjacent node apparatus 203A and the FoSPort (West) of the node apparatus 203B along the route specified by the ERO. In accordance with the instruction from the request message processing unit 91, the cross-connect setup requesting unit 96 requests the cross-connect setting unit 17 to set up the cross connect.

In operation CC, the request message processing unit 91 instructs the response message processing unit 93 to generate a ResvMsg for responding to the PathMsg. The ResvMsg created by the response message processing unit 93 is transmitted from the response message transmitting/receiving unit 94 to the ingress node apparatus 203A which is the originator of the PathMsg.

Reference is made to FIG. 24. In operation AE, the ResvMsg is transmitted from the node apparatus 203B to the node apparatus 203A. In operation AF, the response message processing unit 93 in the node apparatus 203A that received the ResvMsg instructs the cross-connect setup requesting unit 96 to set up the cross connect reserved in operation BF of FIG. 25. With this operation, the path is formed for connecting between the FoSPort (East) of the node apparatus 203A and the link 220A1 leading to the adjacent node apparatus 203B. With the above sequence of operations, the RPR section path connecting between the RPR stations 230A and 230B is set up.

On the other hand, in operation AG, the node apparatus 203B performs operations CD to CG and CI to CK depicted in FIG. 26. In operation CD, the RPR node list processing unit 71 in FIG. 18 determines whether the node apparatus 203B is the RPR-IG node apparatus or not. The determination as to whether the node apparatus 203B is the RPR-IG node apparatus or not may be made by checking whether the RPR node list included in the RPR_RING object carried in the PathMsg is empty or not. Alternatively, the determination as to whether the node apparatus 203B is the RPR-IG node apparatus or not may be made by comparing the node ID of the node apparatus 203B with the value of Ring IG Node ID included in the RPR_RING object. Since the node apparatus 203B is not the RPR-IG node apparatus (N in operation CD), the RPR node list processing unit 71 proceeds to operation CE.

In operation CE, the RPR node list processing unit 71 updates the RPR node list by deleting the node apparatus 203B from the RPR node list included in the RPR_RING object carried in the PathMsg. Further, in operation CF, the RPR node list processing unit 71 decrements by one the value of Num Of Ring Nodes in the RPR_RING object carried in the PathMsg.

In operation CG, the RPR node list processing unit 71 checks whether the value of Num Of Ring Nodes is zero (0) or not. In the illustrated example, the value of Num Of Ring Nodes in the RPR_RING object carried in the PathMsg received by the node apparatus 203B was "2". Accordingly, the value after being decremented in operation CF is "1" (N in operation CG).

In operation CI, the route calculation unit 81 calculates the route from the node apparatus 203B to the node apparatus located at the shortest distance among the node apparatuses included in the RPR node list updated by the RPR node list processing unit 71. In the example of the communication network 210 of FIG. 6, it is assumed that the node apparatus 203F has been identified as the node apparatus located at the shortest distance, and that the route "203B to 203D to 203F" has been calculated as the shortest route from the node apparatus 203B to the node apparatus 203F.

The route calculation unit 81 acquires from the network topology information the link ID of the port FoSPort (West) of the RPR station 230F provided in the node apparatus 203F located at the shortest distance. The route calculation unit 81 creates routing information ERO that specifies the route for the RPR section path leading from the RPR port FoSPort (East) of the RPR station 230B to the RPR port FoSPort (West) of the RPR station 230F along the above shortest route. The node apparatus 203F is thus the egress node apparatus of this RPR section path.

In operation CJ, the request message processing unit 91 creates a PathMsg. The PathMsg includes the ERO created by the route calculation unit 81 and the RPR_RING object. The RPR_RING object includes the RPR node list updated by the RPR node list processing unit 71 and the specification of the RPR-IG node apparatus 203A. As earlier described, the node apparatus included in the RPR node list is the node apparatus 203F, so the value of Num Of Ring Nodes is set to "1". The request message transmitting/receiving unit 92 transmits the PathMsg toward the egress node apparatus 203F.

In operation CK, the route calculation unit 81 instructs the cross-connect reservation requesting unit 95 to reserve the setup of a cross-connect for forming a path connecting between the FoSPort (East) of the node apparatus 203B and the link 220B3 leading to the adjacent node apparatus 203D along the route of the RPR section path. In accordance with the instruction from the route calculation unit 81, the cross-connect reservation requesting unit 95 requests the cross-connect reservation unit 18 to reserve the setup of the cross connect.

With the above operation CJ, the PathMsg is transmitted from the node apparatus 203B toward the node apparatus 203F in operation AH of FIG. 24.

Next, the signaling performed between the node apparatuses 203B, 203D, and 203F in the network of FIG. 6 will be described with reference to FIG. 27. The node apparatus 203D that received the PathMsg transmitted in operation AH reserves the setup of the cross connect for forming the path for the route specified by the ERO included in the PathMsg. In the illustrated example, this path is a path for connecting between the link 220D3 leading from one adjacent node apparatus 203B and the link 220D1 leading to another adjacent node apparatus 203F. In operation DA, the node apparatus 203D transmits the PathMsg to the adjacent node apparatus 203F.

In operation DB, the node apparatus 203F that received the PathMsg performs operations CA to CC depicted in FIG. 26. In operation CA, the request message transmitting/receiving unit 92 receives the PathMsg. In operation CB, the request message processing unit 91 instructs the cross-connect setup requesting unit 96 to set up the cross connect in the node apparatus 203B. The path to be set up by this cross-connect setup is the path for connecting between the link 220F1 leading from the adjacent node apparatus 203D and the FoSPort (West) of the node apparatus 203F along the route specified by the ERO. In accordance with the instruction from the request message processing unit 91, the cross-connect setup requesting unit 96 requests the cross-connect setting unit 17 to set up the cross connect.

In operation CC, the node apparatus 203F transmits the ResvMsg for responding to the PathMsg toward the ingress node apparatus 203B which is the originator of the PathMsg.

Figure 27:
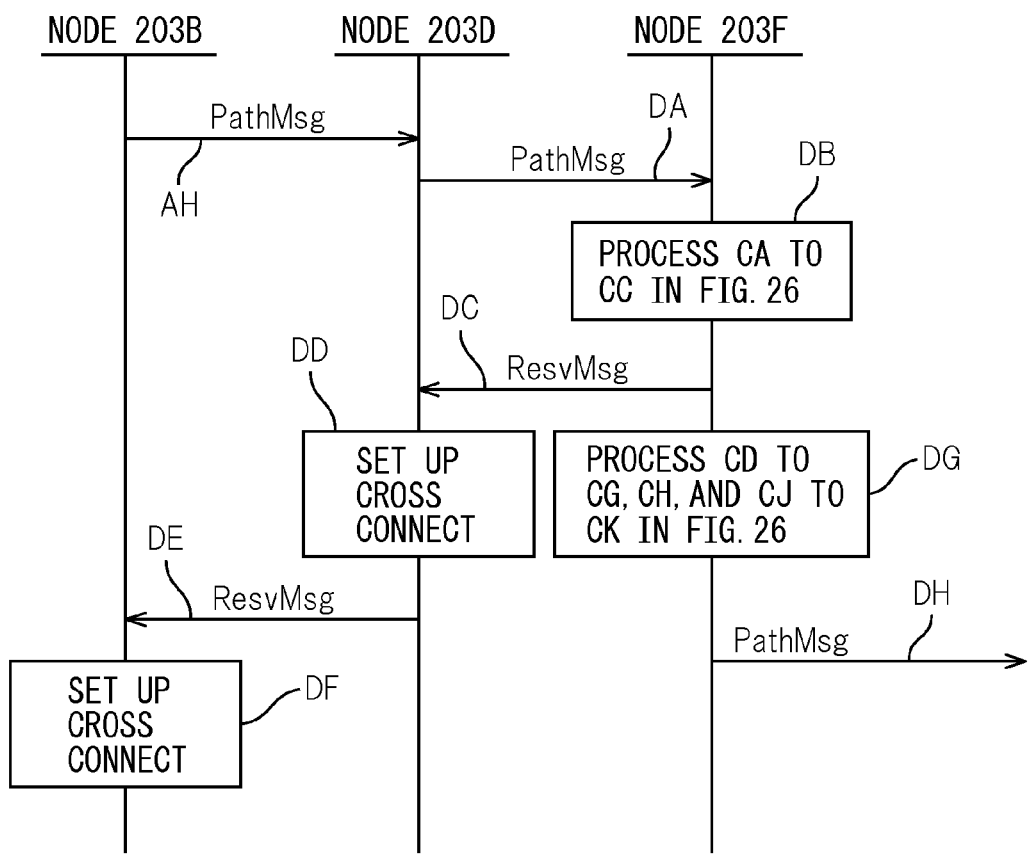
FIG. 27 is a diagram illustrating the signaling performed between the node apparatuses 203B, 203D, and 203F in the network of FIG. 6.

Reference is made to FIG. 27. In operation DC, the ResvMsg is transmitted from the node apparatus 203F to the node apparatus 203D. In operation DD, the node apparatus 203D that received the ResvMsg sets up the previously reserved cross connect for forming the path connecting between the links 220D3 and 220D1. In operation DE, the node apparatus 203D transmits the ResvMsg to the ingress node 203B.

In operation DF, the response message processing unit 93 in the node apparatus 203B that received the ResvMsg instructs the cross-connect setup requesting unit 96 to set up the cross connect reserved in operation CK of FIG. 26. With this cross-connect setup, the path is formed for connecting between the FoSPort (East) of the node apparatus 203B and the link 220B3 leading to the adjacent node apparatus 203D. With the above sequence of operations, the RPR section path connecting between the RPR stations 230B and 230F is set up.

On the other hand, in operation DG, the node apparatus 203F performs operations CD to CG, CH, and CJ to CK depicted in FIG. 26. In operation CD, the RPR node list processing unit 71 in FIG. 18 determines whether the node apparatus 203F is the RPR-IG node apparatus or not. Since the node apparatus 203F is not the RPR-IG node apparatus (N in operation CD), the RPR node list processing unit 71 proceeds to operation CE.

In operation CE, the RPR node list processing unit 71 updates the RPR node list by deleting the node apparatus 203F from the RPR node list included in the RPR_RING object carried in the PathMsg. Further, in operation CF, the RPR node list processing unit 71 decrements by one the value of Num Of Ring Nodes in the RPR_RING object carried in the PathMsg. As a result, the value of Num Of Ring Nodes becomes equal to "0".

In operation CG, the RPR node list processing unit 71 checks whether the value of Num Of Ring Nodes is zero (0) or not. In the illustrated example, since the value of Num Of Ring Nodes is "0" (Y in operation CG), the process proceeds to operation CH.

In operation CH, the route calculation unit 81 calculates the route leading from the node apparatus 203F up to the RPR-IG node apparatus 203A. In the example of the communication network 210 of FIG. 6, it is assumed that the route "203F to 203E to 203C to 203A" is calculated as the shortest route from the node apparatus 203F to the node apparatus 203A.

The route calculation unit 81 acquires from the network topology information the link ID of the port FoSPort (West) of the RPR station 230A provided in the RPR-IG node apparatus 203A. The route calculation unit 81 creates routing information ERO that specifies the route for the RPR section path leading from the RPR port FoSPort (East) of the RPR station 230F to the RPR port FoSPort (West) of the RPR station 230A along the above shortest route. The node apparatus 203A is thus the egress node apparatus of this RPR section path.

In operation CJ, the request message processing unit 91 creates a PathMsg. The PathMsg includes the ERO created by the route calculation unit 81 and the RPR_RING object. The RPR_RING object includes the empty RPR node list updated by the RPR node list processing unit 71 and the specification of the RPR-IG node apparatus 203A. The request message transmitting/receiving unit 92 transmits the PathMsg toward the egress node apparatus 203A.

In operation CK, the route calculation unit 81 instructs the cross-connect reservation requesting unit 95 to reserve the setup of a cross-connect for forming a path connecting between the FoSPort (East) of the node apparatus 203F and the link 220F2 leading to the adjacent node apparatus 203E along the route of the RPR section path. In accordance with the instruction from the route calculation unit 81, the cross-connect reservation requesting unit 95 requests the cross-connect reservation unit 18 to reserve the setup of the cross connect.

With the above operation CJ, the PathMsg is transmitted from the node apparatus 203F toward the node apparatus 203A in operation DH of FIG. 27.

Next, the signaling performed between the node apparatuses 203F, 203E, 203C, and 203A in the network of FIG. 6 will be described with reference to FIG. 28. The node apparatus 203E that received the PathMsg transmitted in operation DH reserves the setup of the cross connect for forming the path for the route specified by the ERO included in the PathMsg. In the illustrated example, this path is a path for connecting between the link 220E1 leading from one adjacent node apparatus 203F and the link 220E3 leading to another adjacent node apparatus 203C. In operation EA, the node apparatus 203E transmits the PathMsg to the adjacent node apparatus 203C.

The node apparatus 203C that received the PathMsg reserves the setup of the cross connect for forming the path for the route specified by the ERO included in the PathMsg. In the illustrated example, this path is a path for connecting between the link 220C3 leading from one adjacent node apparatus 203E and the link 220C1 leading to another adjacent node apparatus 203A. In operation EB, the node apparatus 203C transmits the PathMsg to the adjacent node apparatus 203A.

In operation EC, the node apparatus 203A that received the PathMsg performs operations CA to CC depicted in FIG. 26. In operation CA, the request message transmitting/receiving unit 92 receives the PathMsg. In operation CB, the request message processing unit 91 instructs the cross-connect setup requesting unit 96 to set up the cross connect in the node apparatus 203A. The path to be set up by this cross-connect setup is the path for connecting between the link 220A2 leading from the adjacent node apparatus 203C and the FoSPort (West) of the node apparatus 203A along the route specified by the ERO. In accordance with the instruction from the request message processing unit 91, the cross-connect setup requesting unit 96 requests the cross-connect setting unit 17 to set up the cross connect.

In operation CC, the node apparatus 203A transmits the ResvMsg for responding to the PathMsg toward the ingress node apparatus 203F which is the originator of the PathMsg.

Figure 28:
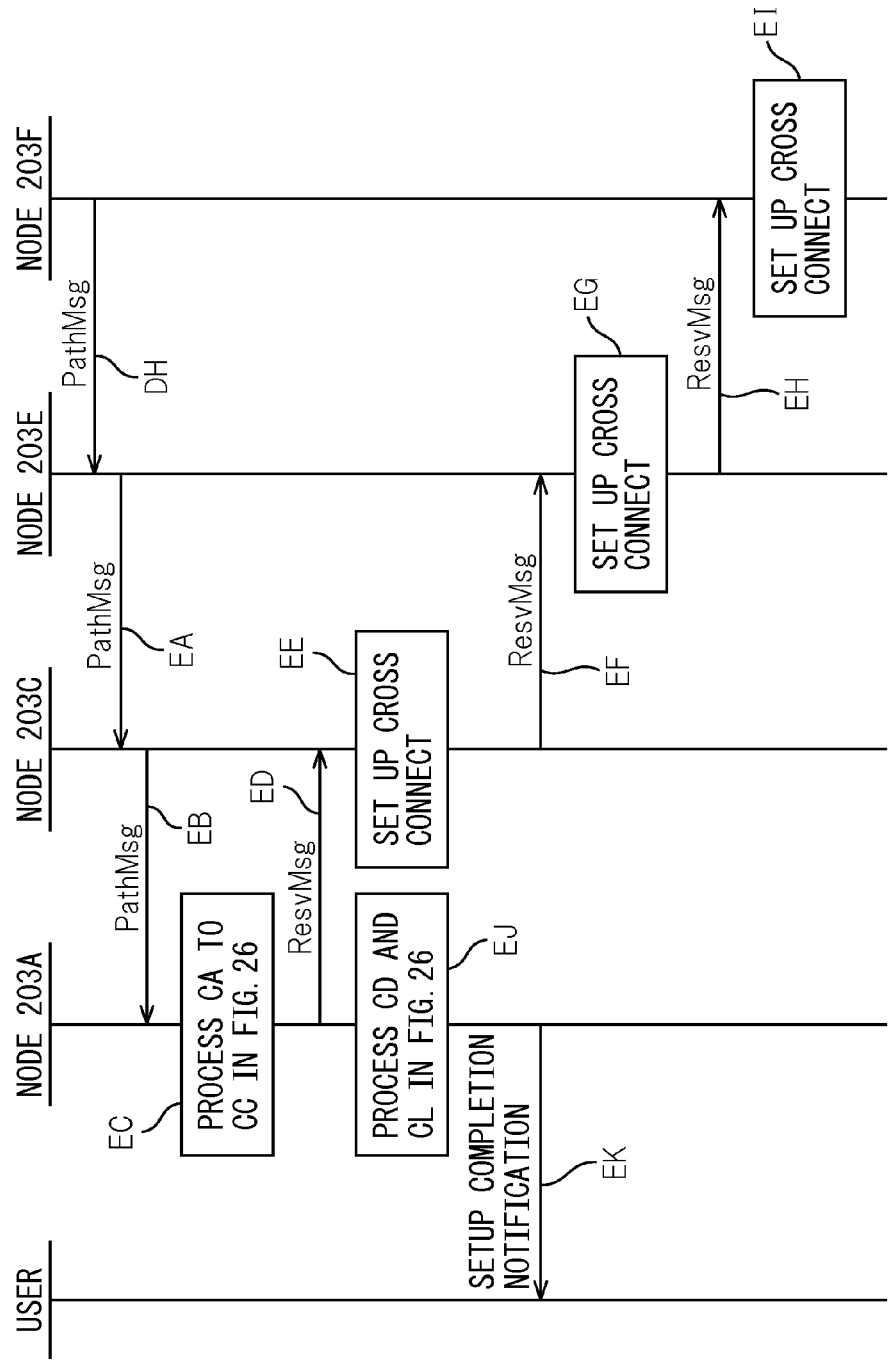
FIG. 28 is a diagram illustrating the signaling performed between the node apparatuses 203F, 203E, 203C, and 203A in the network of FIG. 6.

Reference is made to FIG. 28. In operation ED, the ResvMsg is transmitted from the node apparatus 203A to the node apparatus 203C. In operation EE, the node apparatus 203C that received the ResvMsg sets up the cross connect for forming the previously reserved path for connecting between the links 220C1 and 220C3. In operation EF, the node apparatus 203C transmits the ResvMsg to the ingress node 203E.

In operation EG, the node apparatus 203E that received the ResvMsg sets up the cross connect for forming the previously reserved path connecting between the links 2203E3 and 220E1. In operation EH, the node apparatus 203E transmits the ResvMsg to the ingress node 203F.

In operation EI, the response message processing unit 93 in the node apparatus 203F that received the ResvMsg instructs the cross-connect setup requesting unit 96 to set up the cross connect reserved in operation CK of FIG. 26. With this operation, the path is formed for connecting between the FoSPort (East) of the node apparatus 203F and the link 220F2 leading to the adjacent node apparatus 203E. With the above sequence of operations, the RPR section path connecting between the RPR stations 230F and 230A is set up. The RPR section path connecting between the RPR stations 230A and 230B, the RPR section path connecting between the RPR stations 230B and 230F, and the RPR section path connecting between the RPR stations 230F and 230A are thus set up, completing the construction of the RPR network.

On the other hand, in operation EJ, the node apparatus 203A performs operations CD and CL depicted in FIG. 26. In operation CD, the RPR node list processing unit 71 in FIG. 18 determines whether the node apparatus 203A is the RPR-IG node apparatus or not. Since the node apparatus 203A is the RPR-IG node apparatus (Y in operation CD), the RPR node list processing unit 71 proceeds to operation CL.

In operation CL, the RPR control unit 70 in FIG. 18 notifies the user via the supervisory device 30 that the RPR path setup is completed. With this operation CL, the notification in operation EK of FIG. 28 is accomplished.

According to the present embodiment, the cross-connect setup for setting up the path between the designated RPR port of the RPR unit and the designated port of the line interface unit is automatically performed by the label switching controller 22. This serves to save the labor needed to perform the setup operations. Further, manual setting errors can also be avoided.

Furthermore, in the prior art, the shortest route connecting between RPR stations has been determined manually by the user, thus requiring human labor. According to the present embodiment, since the route connecting between RPR stations can be automatically determined by the label switching controller 22, the human labor can be saved.

Figure 29:
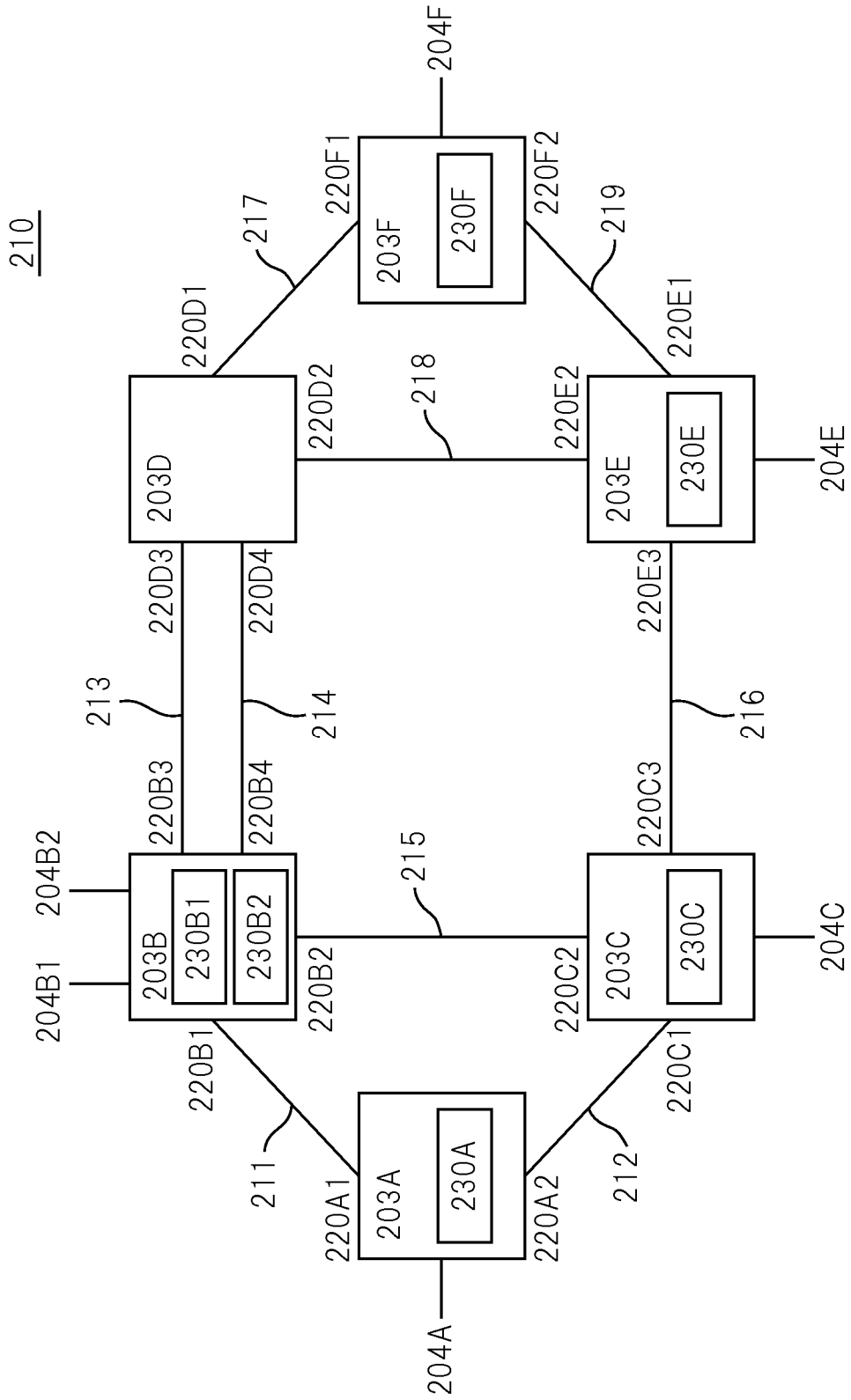
FIG. 29 is a diagram illustrating a second example of the communication network according to an embodiment.

FIG. 29 is a diagram illustrating a second example of the communication network according to the embodiment. In this example, a plurality of different RPR networks are constructed within the communication network 210. The following description is given by taking as an example the case where first and second RPR networks are constructed within the communication network 210. The node apparatuses 203A, 203B, and 203F are equipped with RPR stations 230A, 230B1, and 230F, respectively, for constructing the first RPR network. On the other hand, the node apparatuses 203B, 203C, and 203E are equipped with RPR stations 230B2, 230C, and 230E, respectively, for constructing the second RPR network.

The ring IDs described with reference to FIGS. 15 and 16 are used to discriminate between the first RPR network and the second RPR network. The ring IDs are used as identifiers for identifying the respective RPR networks to which the respective RPR stations and RPR ports belong. FIG. 30 is a table illustrating a second example of the assignment of ring IDs to the respective RPR stations. The ring ID of the first RPR network is assigned a value "900", while the ring ID of the second RPR network is assigned a value "901". FIG. 31 illustrates a second example of the assignment of link IDs to the respective links and RPR ports in the communication network 210.

FIG. 32 is a diagram illustrating an example of the connection link information in the node apparatus 203B. The connection link information stores a record (link ID="7") for the FoSPort (East) of the RPR station 230B1 and a record (link ID="8") for the FoSPort (West) of the RPR station 230B1. The ring IDs in these records are each assigned a value "900" which specifies the first RPR network.

Further, the connection link information stores a record (link ID="9") for the FoSPort (East) of the RPR station 230B2 and a record (link ID="10") for the FoSPort (West) of the RPR station 230B2. The ring IDs in these records are each assigned a value "901" which specifies the second RPR network.

FIG. 33 is a diagram illustrating a second example of the data structure of the network topology information. In a manner similar to the connection link information, the network topology information stores records for the RPR ports belonging to the second RPR network. For example, the records of the link IDs "9" and "10" are records for the RPR ports of the RPR station 230B2 belonging to the second RPR network.

Figure 34:
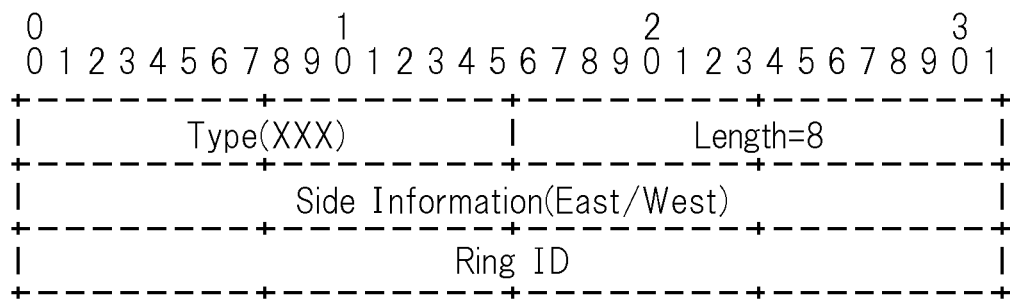
FIG. 34 is a diagram illustrating a second example of the data structure of the RPR FoSPort SubTLV depicted in FIG. 20.

FIG. 34 is a diagram illustrating a second example of the data structure of the RPR FoSPort SubTLV depicted in FIG. 20. The RPR FoSPort SubTLV includes fields for storing "Type", "Length", "Side Information," and "Ring ID." Type, Length, and Side Information are the same as those in the first example described with reference to FIG. 21. Ring ID specifies the ring ID of the RPR network to which the RPR port specified by the LSA data belongs. By advertising the LSA data storing the RPR FoSPort SubTLV of FIG. 34, information concerning the ring IDs of the RPR networks to which the RPR ports of the respective RPR stations belong is distributed to all the node apparatuses 203A to 203F.

An RPR path setup method will be described below for the case where a plurality of RPR networks are constructed within the communication network 210. For simplicity, the following description deals only with the differences from the RPR path setup method earlier described with reference to FIGS. 24 to 28.

In operation AA depicted in FIG. 24, the supervisory device 30 in response to a user operation transmits an RPR path setup request to the RPR-IG node apparatus having an RPR station belonging to the RPR network to be constructed. Here, using the RPR path setup request, the user specifies the ring ID of the RPR network to be constructed. In the description given herein, the ring ID of the RPR network to be constructed may be referred to as the "target ring ID."

In operation BB of FIG. 25, the RPR node list processing unit 71 in the RPR-IG node apparatus identifies all the node apparatuses that are equipped with RPR ports having the same ring ID as the target ring ID in the communication network 210. In operation BC, the RPR node list processing unit 71 creates an RPR node list for the node apparatuses equipped with RPR ports having the same ring ID as the target ring ID, by excluding the RPR-IG node apparatus.

In operation BD, the route calculation unit 81 calculates the route from the RPR-IG node apparatus to the node apparatus located at the shortest distance among the node apparatuses included in the RPR node list. The route calculation unit 81 acquires from the network topology information the link ID of the RPR port FoSPort (West) of the node apparatus located at the shortest distance. The route calculation unit 81 creates routing information ERO that specifies the route for the RPR section path leading from the RPR port FoSPort (East) of the RPR-IG node apparatus to the RPR port FoSPort (West) of the node apparatus located at the shortest distance.

Figure 35:
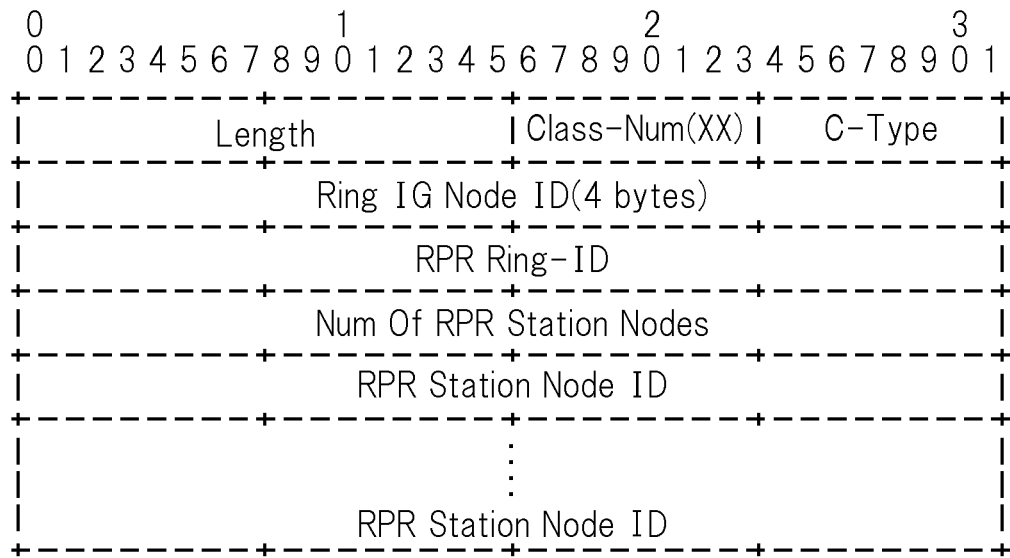
FIG. 35 is a diagram illustrating a second example of the data structure of the RPR_RING object depicted in FIG. 22.

In operation BE, the request message processing unit 91 creates a PathMsg. As illustrated in FIG. 22, the PathMsg includes the ERO created by the route calculation unit 81 and the RPR_RING object. FIG. 35 is a diagram illustrating a second example of the data structure of the RPR_RING object.

The RPR_RING object includes the RPR node list created by the RPR node list processing unit 71, the specification of the RPR-IG node apparatus, and "RPR-Ring ID" which specifies the target ring ID. The request message transmitting/receiving unit 92 transmits the PathMsg toward the egress node apparatus of the RPR section path.

When the PathMsg is received, the RPR node list processing unit 71 in the egress node apparatus of the RPR section path updates the RPR node list in operation CE by deleting the egress node apparatus from the RPR node list included in the RPR_RING object carried in the PathMsg. As earlier described, the node apparatuses included in the RPR node list are those equipped with RPR ports having the same ring ID as the target ring ID.

In operation CI, the route calculation unit 81 calculates the route from the egress node apparatus to the node apparatus located at the shortest distance among the node apparatuses included in the RPR node list updated by the RPR node list processing unit 71. The route calculation unit 81 creates routing information ERO that specifies the route for the RPR section path leading from the RPR port FoSPort (East) of the egress node apparatus to the RPR port FoSPort (West) of the node apparatus located at the shortest distance.

In operation CJ, the request message processing unit 91 creates a PathMsg. As illustrated in FIG. 22, the PathMsg includes the ERO created by the route calculation unit 81 and the RPR_RING object depicted in FIG. 35. The request message transmitting/receiving unit 92 transmits the PathMsg toward the egress node apparatus of the RPR section path.

As described above, the RPR node list created or updated by the RPR node list processing unit 71 is a list of the node apparatuses equipped with RPR ports having the same ring ID as the target ring ID. The node apparatus selected as the egress node apparatus of the RPR section path is selected from this list. As a result, the route for the RPR section path is one that connects between the RPR ports of two RPR stations belonging to the RPR network having the same target ring ID.

In this way, according to the present embodiment, the RPR section path set up between each pair of RPR stations is a path that connects between the RPR ports of the RPR stations having the same target ring ID. By concatenating such RPR section paths, an RPR network can be constructed that interconnects the RPR stations having the same target ring ID. According to the present embodiment, even when constructing a plurality of RPR networks within the same communication network 210, the route connecting between the RPR stations belonging to the same RPR network can be automatically determined by the label switching controller 22.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A node apparatus in a communication network, as a first node apparatus, comprising:
   a processing unit which, in said node apparatus, has a communication port for connection to said communication network, and performs adding and dropping of a frame signal onto said communication network;
   a storage unit which stores topology information having link information that specifies each link existing in said communication network;
   a first route calculation unit which controls switching of a connection between said communication port and another node apparatus;
   a topology information exchanging unit which exchanges said topology information with other node apparatus in said communication network;
   a second route calculation unit which calculates, based on said topology information, a route for a path connecting between said processing unit provided in said node apparatus and an identical processing unit provided in a different node apparatus;
   a node list generating unit which generates, based on said topology information, a node list as a list of node apparatuses equipped with said processing units;
   a node apparatus determining unit which determines a second node apparatus which is one of said node apparatuses, other than said first node apparatus, that are equipped with said processing units;
   a request message generating unit which generates a request message for requesting reservation of a setup of a path along the route calculated by said second route calculation unit and connecting between said first node apparatus and said second node apparatus; and
   a request message transmitting unit which transmits said request message toward said second node apparatus, wherein information that specifies said communication port is included in said topology information as said link information concerning a link connected to said node apparatus, wherein said first route calculation unit controls switching of a connection between said communication port and another node apparatus based on said topology information, and wherein said request message generating unit generates said request message by including therein said node list.

2. The node apparatus as claimed in claim 1, as a third node apparatus, comprising:

a request message receiving unit which receives said request message, wherein said node apparatus determining unit determines a fourth node apparatus which is one of said node apparatuses included in said node list carried in said received request message, but excluding said third node apparatus, said request message generating unit generates a request message for requesting reservation of a setup of a path along the route calculated by said calculation unit and connecting between said third node apparatus and said fourth node apparatus, and said request message transmitting unit transmits said request message toward said fourth node apparatus.

* * * * *